United States Patent

Gould et al.

[11] Patent Number: 5,966,700
[45] Date of Patent: Oct. 12, 1999

[54] MANAGEMENT SYSTEM FOR RISK SHARING OF MORTGAGE POOLS

[75] Inventors: Kenneth L. Gould; Alex J. Pollock, both of Lake Forest; Roger D. Lundstrom, Arlington Heights; Frank D. Whelan, Lake Barrington, all of Ill.

[73] Assignee: Federal Home Loan Bank of Chicago, Chicago, Ill.

[21] Appl. No.: 08/997,119

[22] Filed: Dec. 23, 1997

[51] Int. Cl.[6] .............................. G06F 15/00; G06F 15/21; G06F 17/60; G06F 19/00
[52] U.S. Cl. .................................................. 705/38; 705/35
[58] Field of Search ........................................ 705/35, 38

[56] References Cited

U.S. PATENT DOCUMENTS

| | | | |
|---|---|---|---|
| 4,876,648 | 10/1989 | Lloyd ......................................... | 705/38 |
| 4,953,085 | 8/1990 | Atkins ......................................... | 705/36 |
| 5,611,052 | 3/1997 | Dykstra et al. ............................ | 705/38 |
| 5,644,726 | 7/1997 | Oppenheimer ............................ | 705/38 |

*Primary Examiner*—Allen R. MacDonald
*Assistant Examiner*—James W. Myhre
*Attorney, Agent, or Firm*—Mayer, Brown & Platt

[57] ABSTRACT

The present invention relates to a computer system for managing the allocation of mortgage pool risk between a mortgage originator and a funding institution. The mortgage originator issues a mortgage and the funding institution agrees to assume certain risks such as interest rate and credit risk for the mortgage up to a certain percentage. The mortgage originator and the funding institution enter into a Master Commitment agreement which has an overall credit enhancement value for mortgage funding by the mortgage originator. The system has an input device capable of receiving mortgage data from the mortgage originator. A memory has a database storing the data relating to the mortgage loan, Master Commitment, financial institution and rate and fees. A processor calculates a credit enhancement value as a function of the probability of foreclosure and the severity of loss indicated by mortgage data. An output device produces a delivery commitment in which the mortgage originator assumes obligation for losses up to the credit enhancement value and the funding institution assumes obligation for additional losses.

12 Claims, 24 Drawing Sheets

FIG. 7B

MPF Mortgage Partnership Finance - (Master Commitments)

File  Edit  View  Insert  Format  Records  Tools  Window  Help

PFI: 4001

MC NUMBER: 7001

Detail | CE | Participating | Admin

| | | | |
|---|---|---|---|
| CE Form: | Corporate Guarantee | Estimated Number of Loans: | 300 |
| CE Amount: | $2,275,000.00 | Estimated Maximum Geographic Concentration: | 5.000% |
| CE Percent: | 4.5% | CE Used: | $550,201.61 |
| CE Fee: | 0.110% | CE Available: | $1,724,796.39 |

Fax PNC    Re-Fax PFI

Delivery Commitments

| DC # | DC Amount | Funded Amount | Product | Delivery Type | Locking Date | Closed Date | Status | # Loans Funded | Pair Off Fees |
|---|---|---|---|---|---|---|---|---|---|
| 1 | $119,700 | $119,700.00 | Fixed 30 Year | M | 6/23/97 | 7/8/97 | Expired | 1 | $0.00 |
| 2 | $105,000 | $105,000.00 | Fixed 30 Year | M | 7/8/97 | 7/22/97 | Expired | 1 | $0.00 |
| 3 | $90,000 | $90,000.00 | Fixed 30 Year | M | 7/21/97 | 8/4/97 | Expired | 1 | $0.00 |
| 4 | $100,000 | $100,000.00 | Fixed 30 Year | M | 7/21/97 | 8/4/97 | Expired | 1 | $0.00 |
| 5 | $118,275 | $118,275.00 | Fixed 30 Year | M | 7/21/97 | 8/4/97 | Expired | 1 | $0.00 |
| 6 | $97,000 | $97,000.00 | | | | | | | |
| | $16,491,330 | $16,491,330 | | Delivery Date: | 7/8/97 | | | 148 | $1,498.70 |

Record: 1 of 6

MPF-Mortgage Partnership Finance – (Delivery Commitments) — 800

File Edit View Insert Format Records Tools Window Help

PFI: 4001
MC Number: 7001
DC Number: 1

Detail | Rates/Fees | Reductions | Admin

| Rate | Fee |
|---|---|
| 0.000% | -3.59375000% |
| 7.125% | -3.01562500% |
| 7.250% | -2.43750000% |
| 7.375% | -1.85937500% |
| 7.500% | -1.28125000% |
| 7.625% | -0.76562500% |
| 7.750% | -0.25000000% |
| 7.875% | 0.26562500% |

Locking Date: 6/23/97
Locking Time: 4:57 PM

Note Rate: 8.250%
Maximum Rate: 8.500%
Minimum Rate: 8.000%  — 812

Re-Fax PFI
▲ Next Go Rate

Loans — 808

| MPF Loan Number | PFI Loan Number | Principal | Product Type | Interest Rate | Interim Interest | CE Amount | Agent Fee | Funding Date | Closed Date |
|---|---|---|---|---|---|---|---|---|---|
| 1 | | $119,700.00 | Fixed 30 Year | 6.250% | $135.28 | $6,319.39 | $2,019.94 | 6/26/97 | 6/26/97 |
| | | $119,700.00 | | | $135.28 | $6,319.39 | $2,019.94 | | |

Record: 1 of 91 (Filtered)

MANAGEMENT SYSTEM FOR RISK SHARING OF MORTGAGE POOLS

FIELD OF INVENTION

The present invention relates in general to a system for managing and recording data for a mortgage financing agreement. More specifically, the present invention is a system which performs all calculations and records data necessary for allocating mortgage interest and credit risks between a mortgage originator and a funding institution.

BACKGROUND OF INVENTION

Presently mortgages are issued by mortgage originators such as banks, savings and loans, etc. Homeowners apply for mortgages from the financial institution for the purchase of a housing unit. The mortgage is a loan from the mortgage originator which produces a principal return and an interest stream of income. Individual mortgages may be pooled and the interest stream from the mortgages may be bundled to create mortgage backed securities which may be sold by the mortgage originator. By obtaining favorable funding through pooling many individual mortgages, the mortgage originator may be able to offer competitive interest rates on mortgages for its customers.

Presently, mortgage originators have two choices with regard to issued mortgages. The institution can hold the mortgage in a portfolio or it can sell the mortgage for securitization. By holding the mortgage in a portfolio, the mortgage originator must hold the interest rate risk involved in mortgage portfolios. If interest rates increase, the mortgage originator risks incurring higher funding costs on the mortgages, the revenues from which are locked at a lower interest rate. Additionally, current regulatory capital requirements discourage portfolio lending since a mortgage originator must hold twice as much capital against a whole loan as it does against a mortgage backed security, thereby requiring twice the net return to achieve the same return on equity. Finally, a mortgage portfolio owner has an options risk since mortgagees may prepay the principal more rapidly then expected.

As an alternative to holding mortgages, most mortgage originators sell many of the mortgages they originate into the secondary market. In the process they pay a guarantee fee to the Federal National Mortgage Association (Fannie Mae) or the Federal Home Loan Mortgage Corporation (Freddie Mac). The guarantee fee is paid by the mortgage originator to either Fannie Mae or Freddie Mac to take the credit risks associated with the mortgage. The guarantee fee is typically calculated as 20–25 basis points of the outstanding principal on the mortgage. The payment of the guarantee fees results in a lower capital requirement but provides a lower profit to the mortgage portfolio seller.

Many such mortgage originators obtain funds to finance the mortgage they own from a funding institution such as a Federal Home Loan Bank. These funds allow mortgage originators to extend mortgages to home buyers and retain the mortgage loan on their own balance sheets. The funding institution such as a Federal Home Loan Bank helps mortgage originators to manage the risk of falling interest rates by making long term advances to match the term of home loans or by providing interest rate swaps or other financial contracts to hedge the risk of such rates. However, due to intense competition for mortgage loans and the high cost of managing interest rates, the return on holding mortgage loans is often not acceptable. Mortgage origination institutions are very efficient at performing many of the tasks associated with originating mortgages, but not as efficient at managing the interest rate risk.

Therefore, a need exists for a system which enables a funding institution to manage the allocation of interest rate risk of mortgages between itself and a mortgage originator. Furthermore, a need exists for a system to allow a mortgage originator to transfer the necessary data affiliated with a mortgage loan to a funding institution. Also, a need exists for a system to generate reports on funding between a funding institution and a mortgage originator reflecting the allocation of risk.

SUMMARY OF THE INVENTION

The purpose and advantages of the present invention will be set forth in and apparent from the description that follows, as well as will be learned by practice of the invention. Additional advantages of the invention will be realized and attained by the methods and apparatus particularly pointed out in the written description as well as from the appended drawings.

These objects and others are achieved by the present invention which is embodied in a computer system for managing the allocation of mortgage risk between a mortgage originator and a funding institution. The mortgage originator issues a mortgage and the funding institution agrees to assume certain risks for the mortgage. The mortgage originator and the funding institution enter into a Master Commitment agreement which has an overall credit enhancement value for mortgage funding. The system has an input device capable of receiving mortgage data including principal amount, interest rate, loan to value ratio and debt ratio from the mortgage originator. The system also has a memory having a database storing the data relating to the mortgage loan. A processor calculates a credit enhancement value as a function of a mortgage score reflecting the probability of foreclosure and the mortgage data. An output device produces a delivery commitment in which the mortgage originator assumes obligation for losses up to the credit enhancement value and the funding institution assumes obligation for additional losses.

It is to be understood that both the foregoing general description and the following detailed description are not limiting but are intended to provide further explanation of the novel invention claimed herein. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIGS. 7A-7C are screen prints of the Master Commitment data displays according to the present invention.

FIGS. 8A-8C are screen prints of the delivery commitment data displays according to the present invention.

FIG. 11 is a screen print of the post closing display according to the present invention.

FIGS. 12A-12B are screen prints of the credit enhancement displays according to the present invention.

DESCRIPTION OF THE PREFERRED EMBODIMENT

Figure 1:
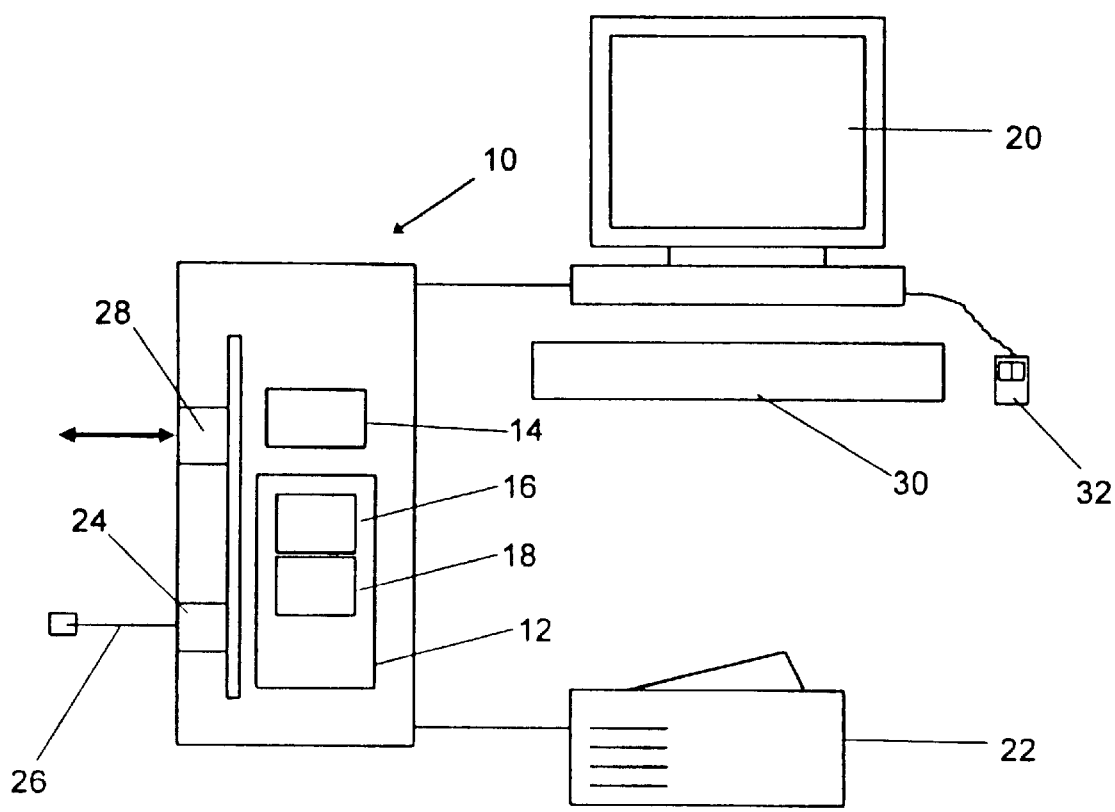
FIG. 1 shows a block diagram of a system according to the present invention to determine the values for credit risk allocation of a mortgage pool.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

The present invention is a management system which is used in conjunction with an agreement between a mortgage originator, such as a bank, a trust or a savings and loan, to share risks with a funding institution such as a Federal Home Loan Bank. Under the risk allocation agreement, the mortgage originator originates and underwrites investment quality mortgage loans. The mortgage originator is also responsible for the servicing of the loans by handling payments on all activities after the loan has closed.

The funding for the mortgage comes from the funding institution. The funding institution, through the management system which will be explained below, determines the amount of credit enhancement required to make the loan eligible for inclusion under the risk allocation agreement. A credit enhancement is a guarantee by the mortgage originator that it will pay loan credit losses under certain conditions. The funding institution also funds the loan and manages the liquidity, interest rate and options risks inherent in holding the mortgages. The mortgage originator retains most of the credit risk above the agreed upon base level, and, as a result, rather than paying a guarantee fee to a secondary market, the mortgage originator will receive a fee for providing the credit enhancement. This program is currently being marketed as the Mortgage Partnership Finance(tm) product by the Federal Home Loan Bank of Chicago.

The funding institution uses the management system of the present invention to calculate the mortgage originator's credit responsibility for each loan. The management system also allows the funding institution to fund a spread account in an amount which approximates the mortgage pool's expected loss performance which is the expected loss due to foreclosures over the pool's life. The spread account establishes the base level credit risk and provides for its coverage by the funding institution. The spread account is used to fund initial losses from the mortgage pool and the mortgage originator's enhancement is only used if the spread account is fully depleted. Thus the credit risk in excess of the base level up to a certain reserve percentage will be liable to the mortgage originator, while catastrophic risk (over the reserve percentage) is taken by the funding institution.

The funding institution and the mortgage originator enter into a Master Commitment agreement which defines the terms under which the funding institution will fund a pool of mortgages to be produced by the mortgage originator. Each Master Commitment agreement will have an associated spread account and maximum credit enhancement amount which are both used to cover segments of credit losses, such as foreclosure, from the assigned pool of mortgages.

The spread account percentage is established by the funding institution after examining historic credit losses incurred by the mortgage originator and estimating the losses on the loans to be originated. The maximum credit enhancement amount is the maximum amount of credit losses for which the mortgage originator is required to reimburse the funding institution for the pool of mortgages. SpeciEic mortgages are included under each Master Commitment agreement by means of delivery commitments. A delivery commitment is an agreement between the funding institution and the mortgage originator which defines the note rates, agent fees, closing time interval, product type, total dollar amount, and other terms pertaining to the funding of certain individual or groups of mortgages.

The risk allocation agreement between the funding institution and the mortgage originator also provides for a Master Servicer. The Master Servicer is an institution which contracts with the funding institution to provide accounting and administrative services for mortgages. Each loan servicer gives detailed accounting records for each loan to the Master Servicer. The Master Servicer keeps shadow accounts for comparison with the accounts of the servicers. The Master Servicer is usually a mortgage bank. Additionally, documents such as the loan note are kept by a custodian which is typically a bank or other financial institution defined under the risk allocation agreement. The custodian contracts with the funding institution to hold certain documents related to the mortgage loans.

The funding institution uses a management system according to the present invention in FIG. 1 to manage the risk allocation agreement. FIG. 1 shows a diagram of the management system for storing financial data and calculating credit enhancement amounts for the risk allocation between the mortgage originator and the funding institution. The management system is embodied in a computer 10 configured to be used for financial record keeping and valuation of risk amounts for mortgage pools. The funding institution also uses the computer 10 to communicate and obtain data from the relevant parties in the risk allocation agreement such as the mortgage originator, the Master Servicer and the custodian.

An example of the computer 10 for the preferred embodiment is an IBM type personal computer with a Pentium 300 Hz microprocessor using a Windows NT operating system. Other general purpose computers configurable to create specific logic circuits such as a Sun SPARC-20 workstation with a SPARC processor using a UNIX operating system may be used for computer 10.

The computer 10 has a storage device 12 which may be a hard drive or other large capacity memory. The computer 10 has a processor 14 coupled to the storage device 12 which reads instructions of programs stored in the storage device 12. The programs configure the processor 14 to create specific logic circuits to carry out the computations described below. A program for managing a risk allocation agreement, such as a program 16, embodying the principles of the present invention is stored on the storage device 12. Thus, the program 16 configures the processor 14 to become a mortgage risk assessment and data management circuit. The storage device 12 also has a database record area 18 which is used to store the data used by the program 16 as will be explained above.

The computer 10 has a variety of output devices. Data and instructions may be displayed to the user on a display device 20 which is a CRT. Data is stored in storage device 12 and may be printed from a printer 22. The computer 10 includes a fax/modem 24 which is connected to a telephone line 26, creating an interface with the various mortgage originators for exchange of essential data for the system operation. The computer 10 also has a network interface 28, which may be an Ethernet card, coupled to other computers maintained by the funding institution in order to exchange data and access other relevant information. A keyboard 30 and a mouse 32 are provided for user entry of data and manipulation of the program 16 on the display device 20.

Figure 2:
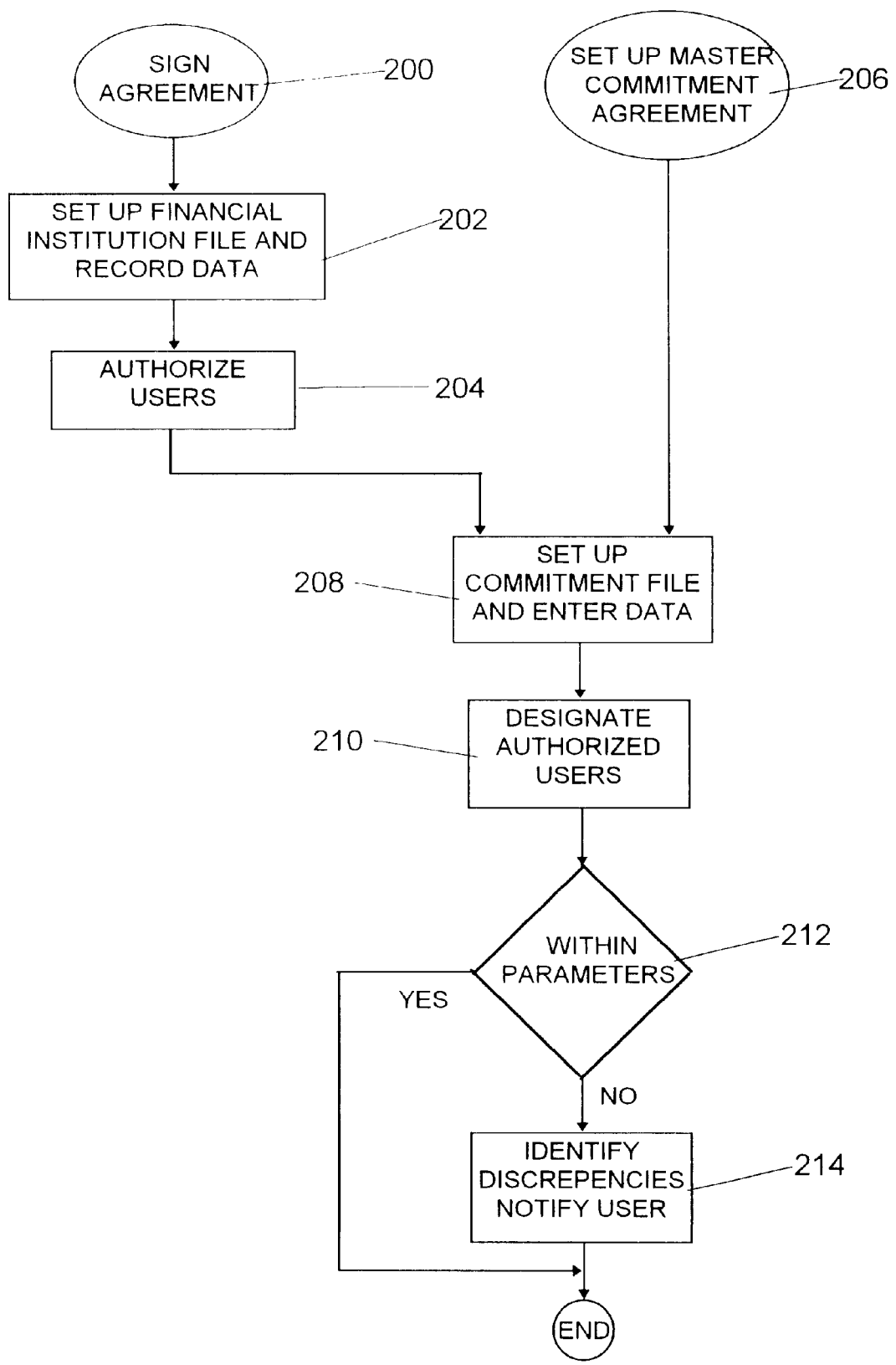
FIG. 2 is a flow diagram of a routine to set up the data files relating to a mortgage originator and a Master Commitment according to the present invention.

FIG. 2 is a flow diagram of the initial data input routine of the program 16 according to the present invention. In FIG. 2 and the preceding flow diagrams, ovals represent inputs which are required by the mortgage originator to transmit data to the computer 10 running the program 16 of the present invention. This information may be entered manually through the keyboard 30 and the mouse 32 or it may be transmitted by the mortgage originator in an electronic form through the fax modem 24 or the network interface 28. Rectangular boxes represent the steps taken by the program 16 according to the present invention.

The mortgage originator must first subscribe to a risk allocation agreement with the funding institution as described above in step 200. A new file is created in the database 18 for data relating to the mortgage originator in step 202. Various information from the mortgage originator is gathered by the mortgage originator and entered into the computer 10 by the funding institution in step 202. This information includes the mortgage originator's name, address, type of institution, deposit account numbers, tax identification number, employee users, and contact information. This information is then entered and recorded in the newly created file. The necessary data access to the program 16 for transactions by the mortgage originator is the set up in step 204.

The mortgage originator also signs a Master Commitment agreement with the funding institution in step 206 as explained above. The information from the Master Commitment agreement is then entered by the user into the computer 10. The program 16 then sets up a Master Commitment file in step 208 in the database 18. The Master Commitment agreement allows more than one funding institution to participate in the risk allocation for a mortgage originator's mortgages. However, for purposes of this explanation, it will be assumed only one funding institution is participating in the Master Commitment agreement. The Master Commitment information entered in step 208 includes information such as the date the commitment is opened, expected duration, dollar size, maximum credit enhancement amount, spread account size, credit enhancement fee and estimated number of loans. The percentage participation of each participating funding institution may also be recorded. This data is placed in the newly created Master Commitment data file in the database 18 which corresponds to the particular mortgage originator.

The program 16 also only allows authorized users to open and edit the Master Commitment data files. Once the Master Commitment file is set up in step 208, the system allows the user to designate authorized users in step 210. The program 16 performs checks in step 212 to insure that the Master Commitment information conforms to all program parameters of the agreement between the funding institution and the mortgage originator. If any discrepancies are found, the program will inform the user and identify the discrepancies in step 214. The user may make appropriate corrections to the Master Commitment information.

Once the Master Commitment and mortgage originator database files are set up for the mortgage originator in the database 18, each mortgage loan which qualifies as an investment mortgage by meeting the parameters of the risk allocation agreement will be recorded by the program 16 as will be explained below. FIG. 3 is a flow diagram of the routine used by the program 16 to evaluate and record data relating to individual mortgage loans. Under the risk allocation agreement between the funding institution and the mortgage originator, all mortgage loans which are submitted by the mortgage originator are evaluated for eligibility participation under the risk allocation agreement. As with other mortgages, the mortgage originator takes the mortgage application and makes the underwriting decision in step 300.

The data from the loan is gathered by the mortgage originator for credit enhancement analysis in step 302. The data may be sent from the mortgage originator in the form of documents for manual data entry or electronic data records may be transmitted directly to the computer 10 via the fax/modem 24. The program 16 enters and records the credit enhancement data in step 304. In step 306, the credit enhancement data is stored in a data file related to that loan in the database 18 for later use. The specific data file is connected to the appropriate mortgage originator's data files. The credit enhancement data includes all the information required to calculate credit enhancement for specific loans and is classified by several elements such as the borrower, the property, loan amount, interest rate, etc. The credit enhancement data can include the mortgage originator identification number, loan number, borrower name, income, FICO, property address, property type, occupancy type, loan purpose, loan type, loan amount, interest rate, loan to value ratio, debt ratio, and private mortgage insurance coverage. This data is also logged in the database file affiliated with the mortgage originator in step 308.

The program 16 then proceeds to step 310 where it calculates a mortgage score according to well known methods. The mortgage score is a value representing the probability that a loan may foreclose. The preferred embodiment makes a call to Mortgage Guarantee Insurance Corporation (MGIC) software using the MGIC LPS model to calculate the mortgage score. However, any similar program from other vendors may be used for obtaining the mortgage score in step 310.

The mortgage score and other data such as income, FICO, property address, property type, occupancy type, loan purpose, loan type, loan amount, interest rate, loan to value ratio, debt ratio, and private mortgage insurance coverage from step 304 is then input for analysis using the S&P Levels model in step 312. The preferred embodiment makes a call to the S & P Levels II software program for obtaining this analysis. The credit enhancement dollar amount is calculated for each specific loan by the S&P Levels model in step 314. The credit enhancement dollar amount is the expected loss severity applied to the foreclosure frequency which produces a required loss coverage value. The mortgage score and credit enhancement dollar amount from steps 310 and 312 are recorded in the file of database 18 corresponding to the loan.

In step 316, the program 16 displays the calculated credit enhancement dollar amount and other identification information such as the mortgage originator number, loan number, etc. on display 20. The program 16 then transmits the credit enhancement data displayed in step 316 to the mortgage originator via the fax/modem 24 in step 318. However other methods of communicating the data may be utilized. Since a loan may be enhanced more than once the data is organized so that all enhancements are maintained in date sequence in the database file for each loan.

The program 16 then proceeds to access rate and fee schedules produced from time to time as described starting with step 320. The program 16 references external mortgage marketing pricing data for each product type and downloads this data from the network port 28 in step 320. This external data may be taken from sources such as Bloomberg, Telerate and Reuters which have interfaces to download data to a data terminal. Other means of obtaining external rate and fee data may be employed.

The proposed rate and fee schedules are presented in a manner so the agent fees may be adjusted to conform to market buy up and buy down calculations and to various delivery schedules offered. These are adjustments for over and under pricing which adjust prices to account for buy up or buy downs as required in loan markets. In step 322, the program 16 checks the existing rate and fee schedules against the external rates and fees obtained in step 320. If the rates and fees are outside an acceptable tolerance value of the external fees, the program 16 deactivates the existing activated rate and fee schedules in step 324. The tolerance values are determined by the judgment of the funding institution and are typically set between 20–50 basis points of the loan principal. The new external rates and fees are then substituted for the existing rates and fees in step 326. The program then proceeds to step 328.

If the existing rates and fees are found within the tolerance value in step 322, the program 16 proceeds to step 328. In step 328 the program adjusts the rates so that a schedule of mortgage note rates and associate agent fees is output in one-eighth percentage increments. The note rates and associate fees are rounded to the nearest one-eighth increment in step 328. The resulting fees and rates may be externally validated in step 330 to determine whether they conform to required option-adjusted spread yields which are calculated for external validation. The verified rate and fee schedule is then activated automatically and displayed to the user in step 332 on the display 20. The information is also transmitted to the mortgage originator by the fax/modem 24 in step 334.

Once the mortgage originator has the necessary data from the routine in FIG. 3, the mortgage originator decides whether to include the particular mortgage in the risk allocation program. FIGS. 4A–4C are a flow diagram of the loan funding confirmation routine of the program 16 which is used by the funding institution to confirm funding on the mortgage loans. The mortgage originator selects loans for the risk allocation program in step 400. The mortgage originator then checks whether the fee and rate schedules obtained from step 336 of FIG. 3 are acceptable in step 402. Assuming that the fees and rates are found acceptable in step 402, the mortgage originator then requests a delivery commitment from the funding institution in step 404.

The request for a delivery commitment is received by the computer 10 and recorded in a new delivery commitment file in step 406. The new delivery commitment file is created in the database 18 to support the delivery commitment agreement between the mortgage originator and the funding institution. Relevant data is also entered with the delivery commitment request. This data includes delivery amounts, product type (length of mortgage), rate and fee schedule numbers and note rates (interest rates). The program 16 insures that such data is in conformance with program parameters in step 408. Data related to the appropriate mortgage originator and master commitment data, such as the maximum credit enhancement, is taken from the appropriate database files in step 410. Depending on the product type entered in step 406, the appropriate rate and fee schedules are displayed to the user in step 412. The display of the delivery commitment confirmation data allows the user to check the confirmation information and make changes manually if needed. A fax is then sent via the fax/modem 24 to the mortgage originator to confirm the information in step 414. The mortgage originator then makes a request to the program 16 for funding of the transaction in step 416.

The program 16 gathers the necessary data from the various data files relating to the Master Comritment, the mortgage originator, delivery commitment and the loan to determine funding in step 418. The funding information is entered by the user or recalled from the data files. The data evaluated may include the mortgage originator identification number, delivery commitment number, mortgage originator loan account number, principal amount, interest rate, closing date, first payment date, interim interest, loan term and principal and interest amount.

In step 420, the system 10 analyzes and compares the loan data taken from the database files associated with the loan in step 418 for validation purposes. The validations performed in step 420 include checking whether 1) there is a valid credit enhancement for that loan; 2) whether there is a valid delivery commitment open for loans of that product type; 3) whether the unused balance of the credit enhancement for the Master Commitment is greater than the credit enhancement for the loan to be funded. If the loan data meets these validation checks, the program proceeds to step 422.

The data is checked in step 422 to insure conformance with the agreements between the mortgage originator and the funding institution. If the data is not in conformance, the program proceeds to step 424. The program 16 will indicate to the user that the funding is denied in step 424 if any of the validation checks performed by step 420 are invalid or if the loan is not in conformance with the agreement in step 422. The user then informs the mortgage originator that the loan is not in conformance with the risk allocation agreement.

If the loan is successfully validated and checked in steps 420 and 422, the program 16 proceeds to step 426 where the funding information is displayed to the user. The information is also confirmed by faxing a confirmation form back to the mortgage originator via the fax/modem 24 in step 428. Data such as funding information from the appropriate database file is added to the confirmation form such that the ownership of the loan is specified in the wording of the confirmation. This information affiliated with the loan is recorded in a master data file in the database 18 in step 430. The program updates all the loan records in the database 18 to indicate that a specific loan has been funded in step 432. The loan is associated with a specific delivery commitment data file which in turn is associated with the specific Master Commitment file in the database 18. The balance of the Master Commitment file is updated along with the associated credit enhancement obligation in step 432.

The program 16 creates two daily database files. A first database file records all loans funded during a specific date.

The first database reflects the specific information required by the documents custodian to audit the actual loan documents as they are received from the mortgage originator. The second database file records all changes to loan data related to loans previously reported to a custodian in step 444 as will be explained below.

The program 16 updates the first database with the loan data for the particular loan entered in the above process in step 434. The second database relating to data changes is updated in step 436 to record changes to loan data related to loans previously reported to the custodian. The program 16 then checks whether it is the end of the day in step 438. If it is the end of the day, the updated database files are transmitted to the custodian in step 440.

After the loan information is stored in the loan file in step 434 and the daily databases in steps 430 and 440, the program 16 produces loan reports in step 442. These reports are derived from data including identification of all accounting transactions, funding information, delivery commitment information, etc. which are tailored to produce the loan information reports in step 442. After producing the loan reports in step 442, the general ledger of the funding institution is updated in step 444. The general ledger entries are updated in step 444 to reflect the funding of the specific loan. Entries are produced to reflect the booking of delivery commitments from the mortgage originator in the general ledger. All entries are edited, labeled and formatted to assure they conform with the requirements of the agreement to the other systems which will be explained below. Reports are then produced to reconcile the loan data with the values in the general ledger in step 446.

The funding data used by the program 16 is also used to produce participant reports in step 448. The participant reports are a series of reports for each participating funding institution so each institution can record a proportional share of all transactions between the mortgage originators and the funding institutions in its internal record keeping system. The reports are automatically faxed via the fax/modem 24 to each participating funding institution in step 450. The reports may be sent to the participating banks on a preset time interval. The preferred embodiment sends such reports generated in step 448 on a daily basis.

The funding record in step 430 is also combined with audit data from the audit subroutine which will be described below in conjunction with FIG. 5 in order to generate Daily Investment Deposit (DID) transactions in step 452. The Daily Investment Deposit is an account held by the mortgage originator with the funding institution to provide a source of finance for day to day transactions. The transactions are created in the appropriate DID in step 452. The entries are also automatically batched and sent to the funding institution's deposit system in step 456. Reports are produced and used to reconcile the loan output to the deposit recordation system of the funding institution in step 456.

Figure 4A:
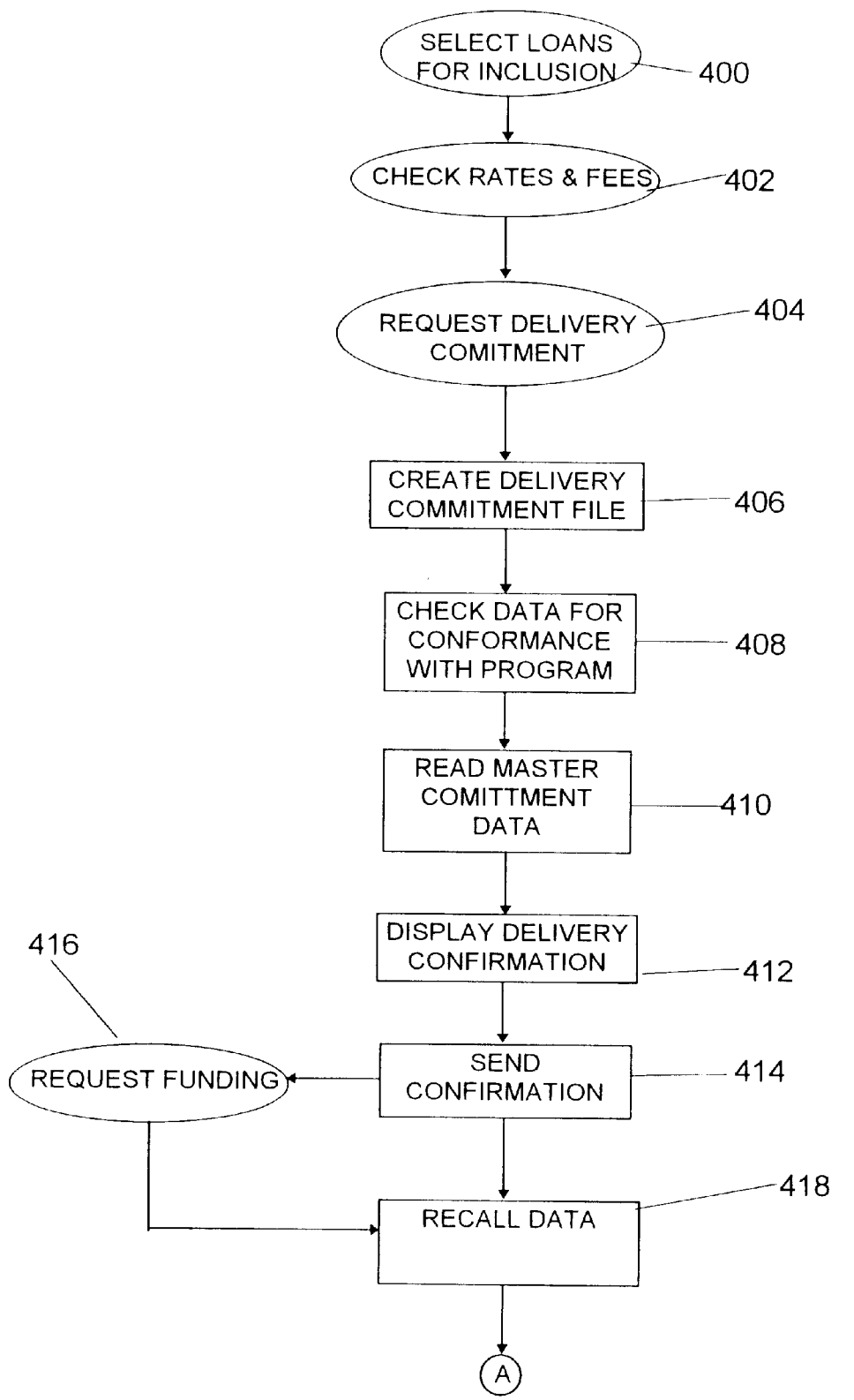
FIGS. 4A–4C are a flow diagram of a funding routine to analyze whether a mortgage loan is qualified to be funded under the agreement between the mortgage originator and the funding institution according to the present invention.
Figure 4B:
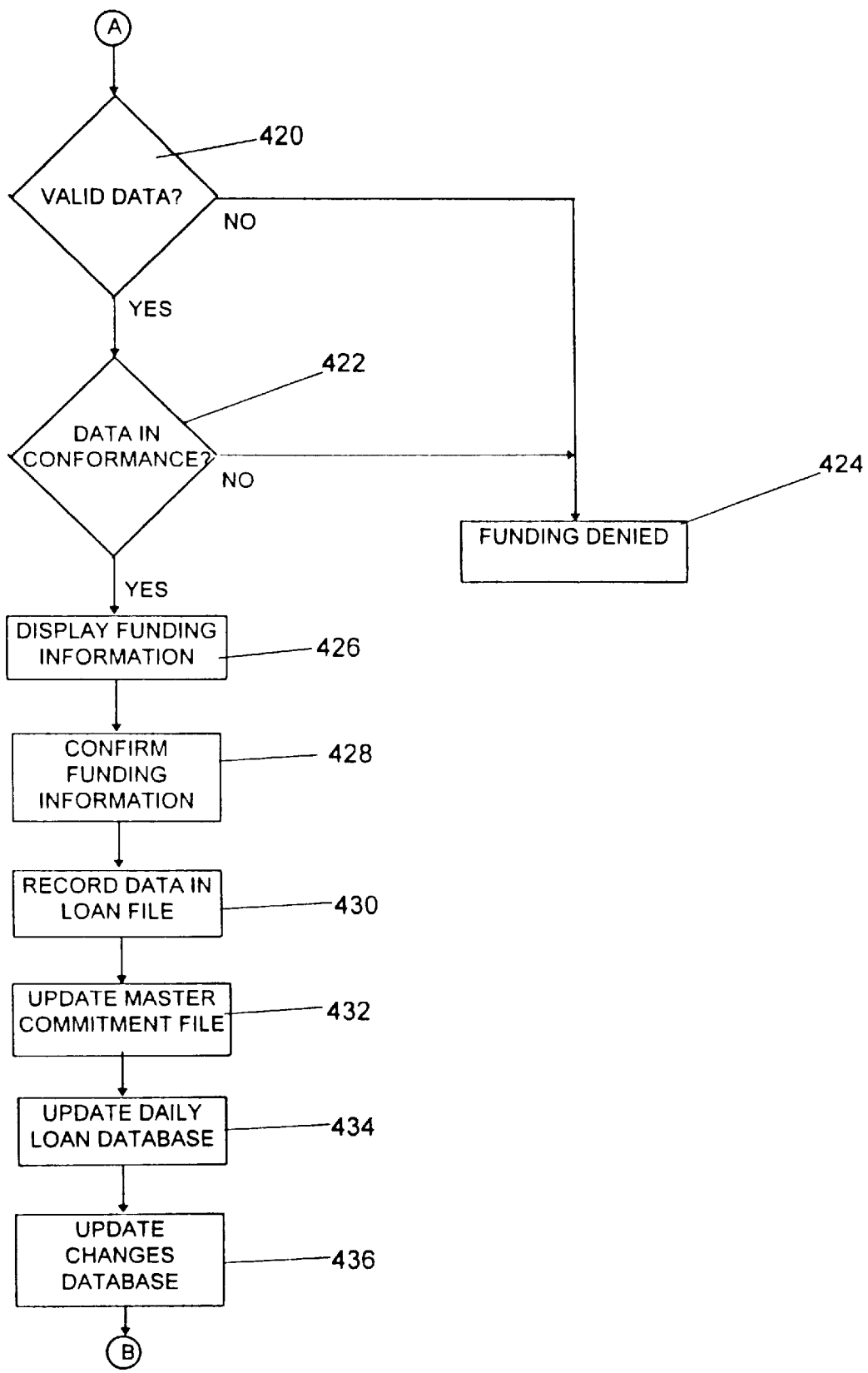
Figure 4C:
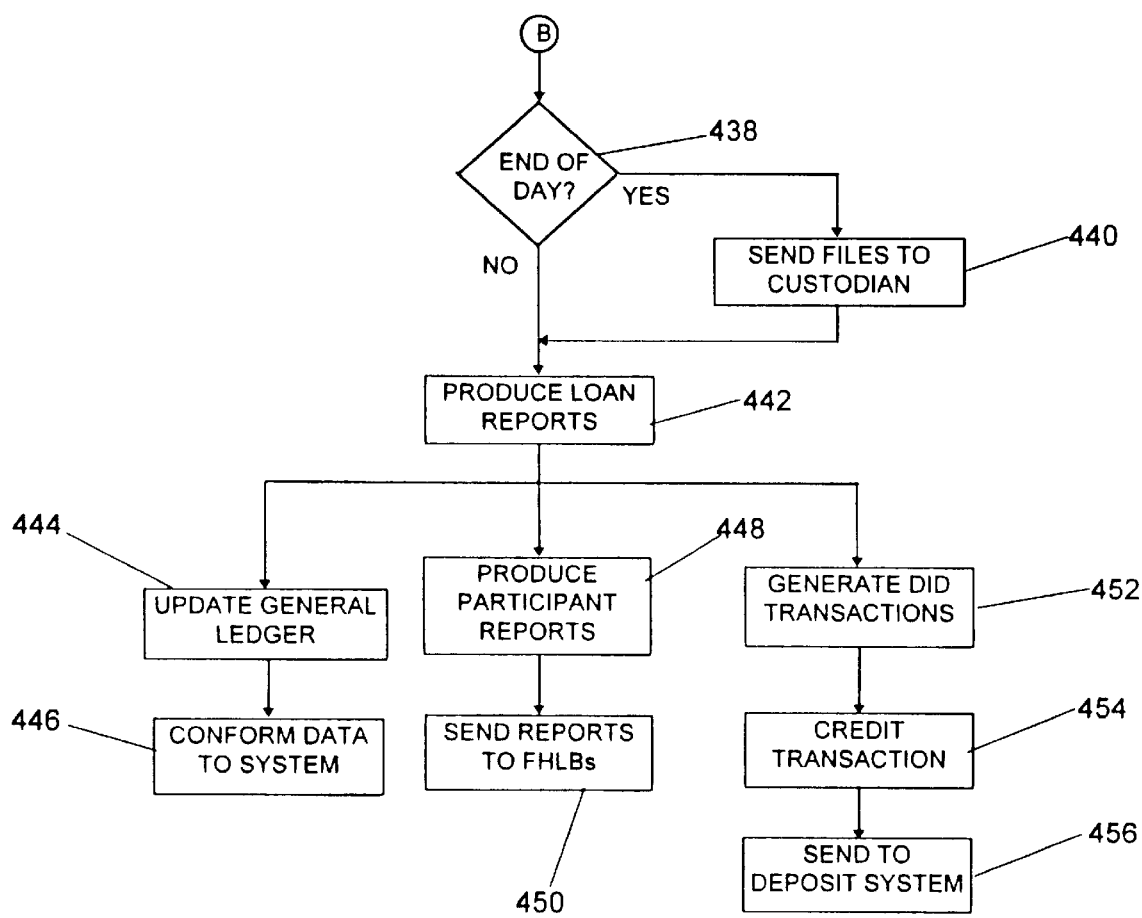
Figure 5A:
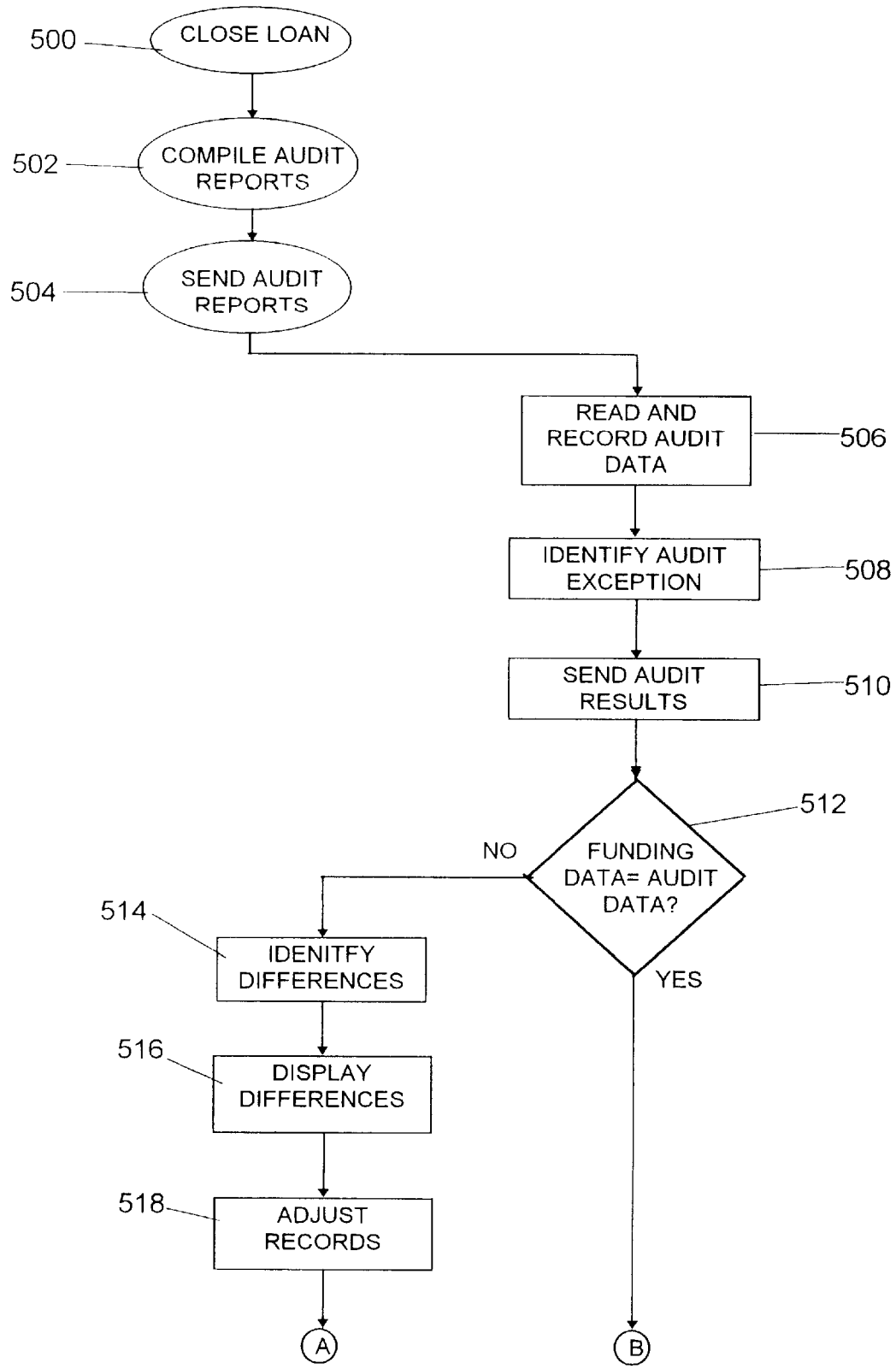
FIGS. 5A-5B are a flow diagram of an audit routine to audit the mortgage loans issued under the risk allocation scheme according to the present invention.
Figure 5B:
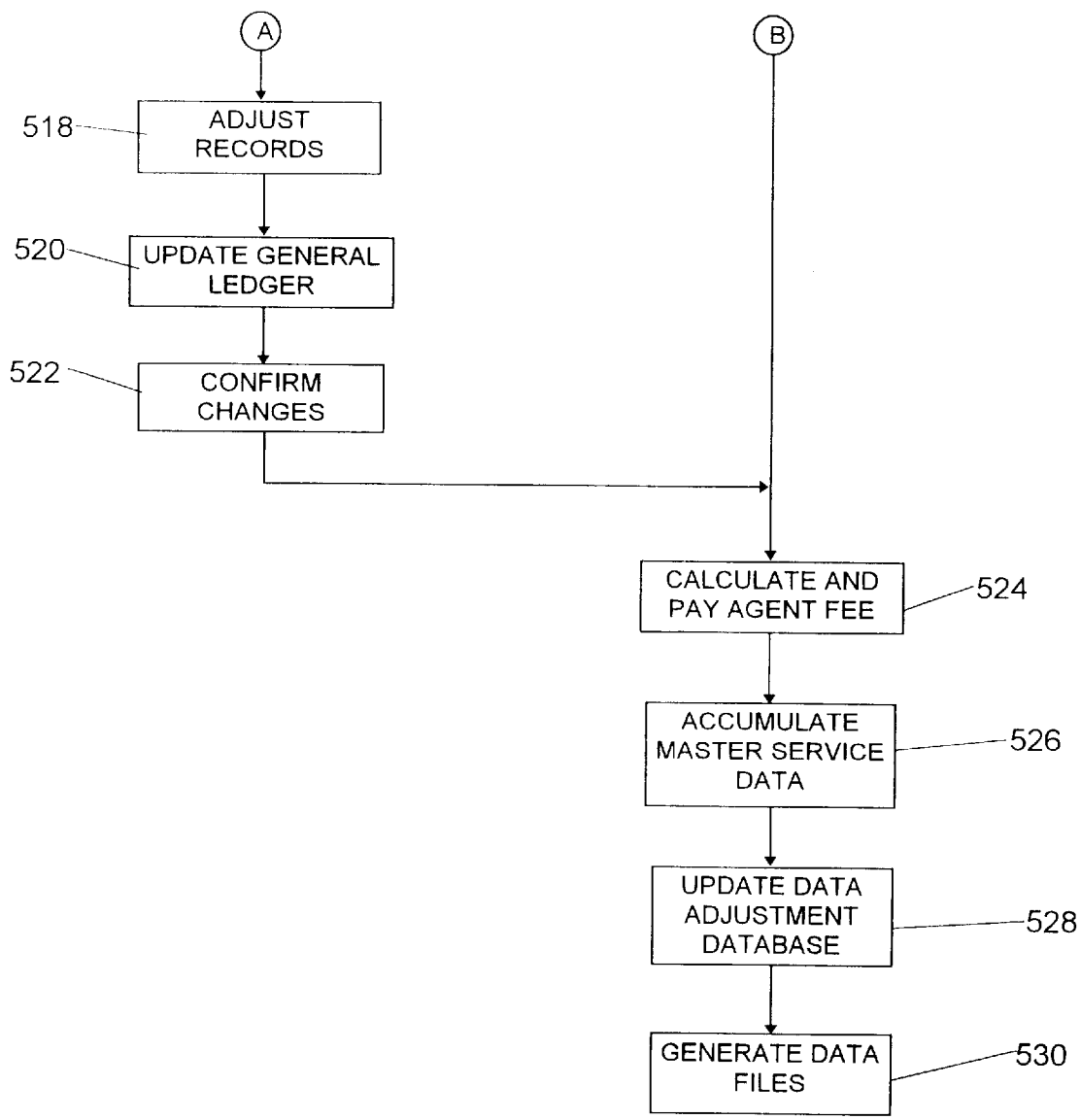

FIGS. 5A and 5B are a flow diagram of the audit subroutine of the program 16. During the closing process, the mortgage originator prepares closing instructions and closes the loan with the borrower in step 500 and sends the documents to the custodian. The custodian compiles reports from the funding institution generated in step 434 of FIG. 4 to generate a report of the results of the audit in step 502.

At the end of each business day, the custodian sends an automated file to the system reporting the results of loans audited that day in step 504. This file is read by the program 16 and the results are incorporated into its records in step 506. Each loan is identified as to whether an audit exception was noted in step 508. An audit exception occurs when the custodian determines that a loan document does not conform with the loan data. The system separates the audit results by mortgage originator files in the database 18 and distributes these reports to each mortgage originator via fax/modem 24 in step 510.

The program 16 then compares the audit data to the funding data for each loan in step 512. If the audit data differs, the differing data is identified in step 514. These differences are flagged and displayed to the user for action in step 516. Examples of differences which may be identified by the program 16 are principal funded, interest rate, interim interest, closing date, borrower name, property address, zip code and property type.

The program 16 then proceeds to step 518 and adjusts the accounting records to reflect any differences identified in step 514 and to reverse the initial transaction. The program then updates the general ledger of the funding institution in step 520. Confirmations of each adjustment are sent to the relevant mortgage originator in step 522.

Once the transaction is in conformance with the audit data in either step 512 or 520, the program 16 calculates the agent fee for every loan approved in step 512 or 520. The program 16 calculates the agent fee payable to the mortgage originator by multiplying the principal balance of a loan by the appropriate agent fee from a rate and fee schedule stored in the database file for that delivery commitment. The fee is then paid to the agent in step 524.

After the data is recorded in step 506 and audit results are distributed in step 510, the information is passed to a master service database file which is accumulated in step 526. For every new loan with the next payment date equal to the first of next month, the system accumulates all the data necessary to be sent to the Master Servicer for purposes of providing service functions. Examples of data accumulated by loan are closing date, principal, date, balance, interest rate, spread account percentage, principal and interest amount and next payment due date. This data is accumulated into the database file and sent to the Master Servicer monthly. The preferred embodiment performs this step five business days prior to the end of each month.

Another database file is accumulated and passed for all loans passed previously and which had data adjustments in step 528. In step 530, the program 16 produces data files for the information noted in step 526 in a format compatible to the data system of the Master Servicer. This file is transmitted to the Master Servicer. In the preferred embodiment, this takes place on the fifth business day prior to the end of the calendar month.

The program also produces a number of standard reports on request of the user on daily, weekly and monthly basis for use by the mortgage originator management, the funding institution management and participating funding institutions. Examples of data which may be shown on these reports include data from reconciliation of the information related systems, data from participating banks to book their required accounting, data showing daily activity and Master Commitments, delivery commitments, credit enhancements, fundings and post closings, data showing mortgage originators on master commitments, delivery commitments, credit enhancements and funding.

Figure 6:
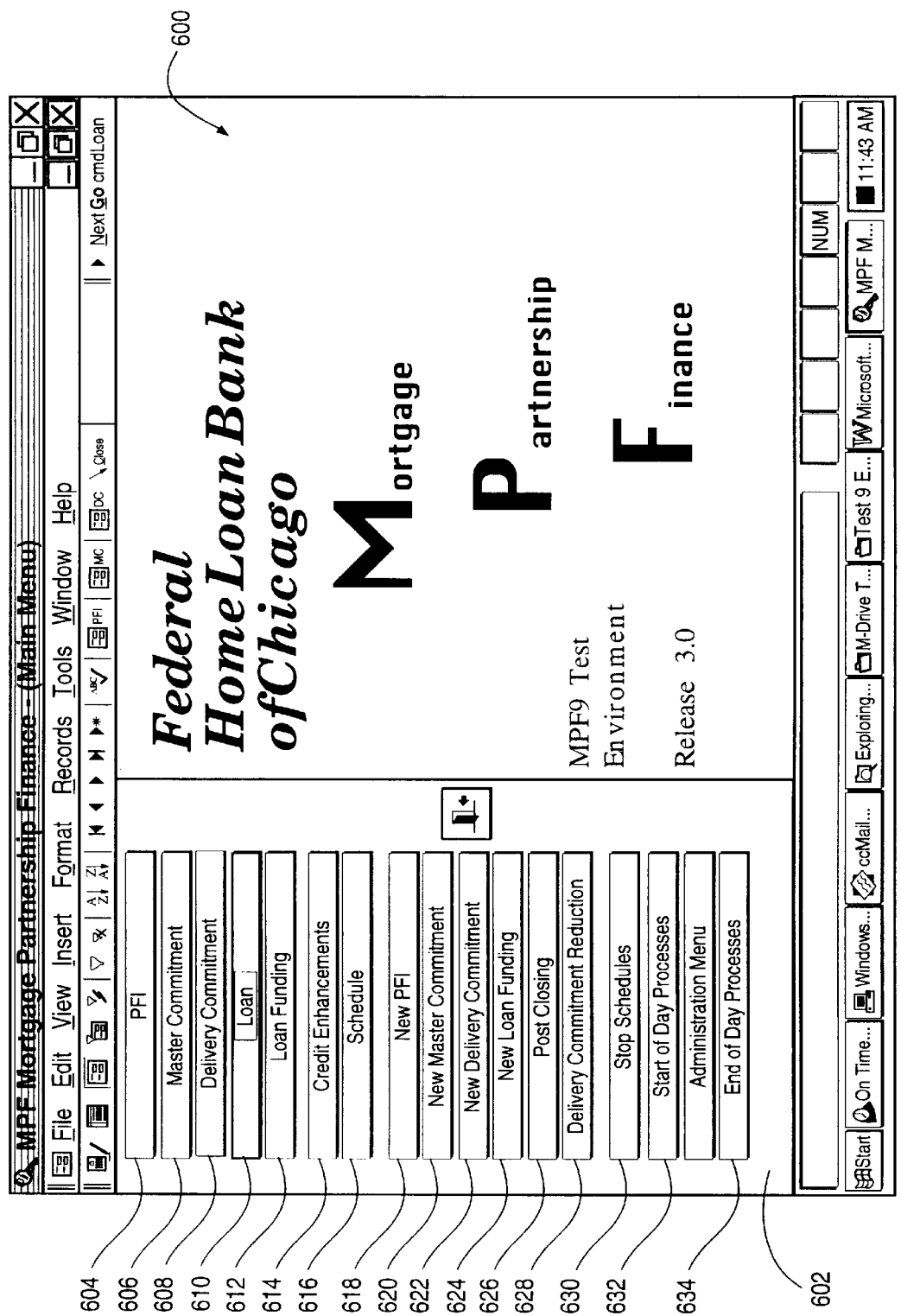
FIG. 6 is a screen print of the menu screen of a program according to the present invention.

One example of the present invention is embodied in a Windows NT version of the program 16 which generates the following screens on the display 20 to the user. The following is an explanation of certain functions of the routines shown in FIGS. 2–5 with reference to various screen prints of user displays. FIG. 6 shows a screen print of a main menu screen 600 of the program 16. The buttons 602 on the left side of the main menu screen 600 activate various routines which have been described above and the display of various types of data. A PFI button 604 allows a user to display the data in the data file associated with a mortgage originator entered in step 202 of FIG. 2. A Master Commitment button 606 allows a user to display the data associated with a specific Master Commitment entered in step 208 of FIG. 2. A delivery commitment button 608 allows a user to display the data associated with a specific delivery commitment entered in step 412 of FIG. 4A. A loan button 610 allows a user to display the data associated with a specific mortgage loan entered in step 430 of FIG. 4B.

A loan funding button 612 allows a user to display data entered in the funding routine shown in FIGS. 4A–4C. A credit enhancements button 614 allows a user to display credit enhancement values calculated in step 314 of FIG. 3A. A schedule button 616 allows a user to display schedules and rates determined in steps 320 and 328 of FIG. 3B.

A new PFI button 618 allows a user to create a data file associated with a new mortgage originator in step 202 of FIG. 2. A new Master Commitment button 620 allows a user to create the data file associated with a new Master Commitment in step 208 of FIG. 2. A new delivery commitment button 622 allows a user to create a new data file associated with a new delivery commitment in step 412 of FIG. 4A. A new loan funding button 624 allows a user to create a data file associated with a new mortgage loan in step 430 of FIG. 4B.

The menu 602 also includes a post closing button 626 which allows a user to confirm data as of the date of the loan funding. A delivery commitment reduction button 628 allows a user to view a screen displaying information on any reductions of a delivery commitment. A stop schedules button 630 allows a user to freeze the use of existing fee schedules while new schedules are produced. A start of the day processes button 632 allows a user to bring the routines of the program 16 to an active status. An end of the day processes button 634 allows a user to access daily system closing routines such as reports production and accounting entry generation routines.

Figure 7A:
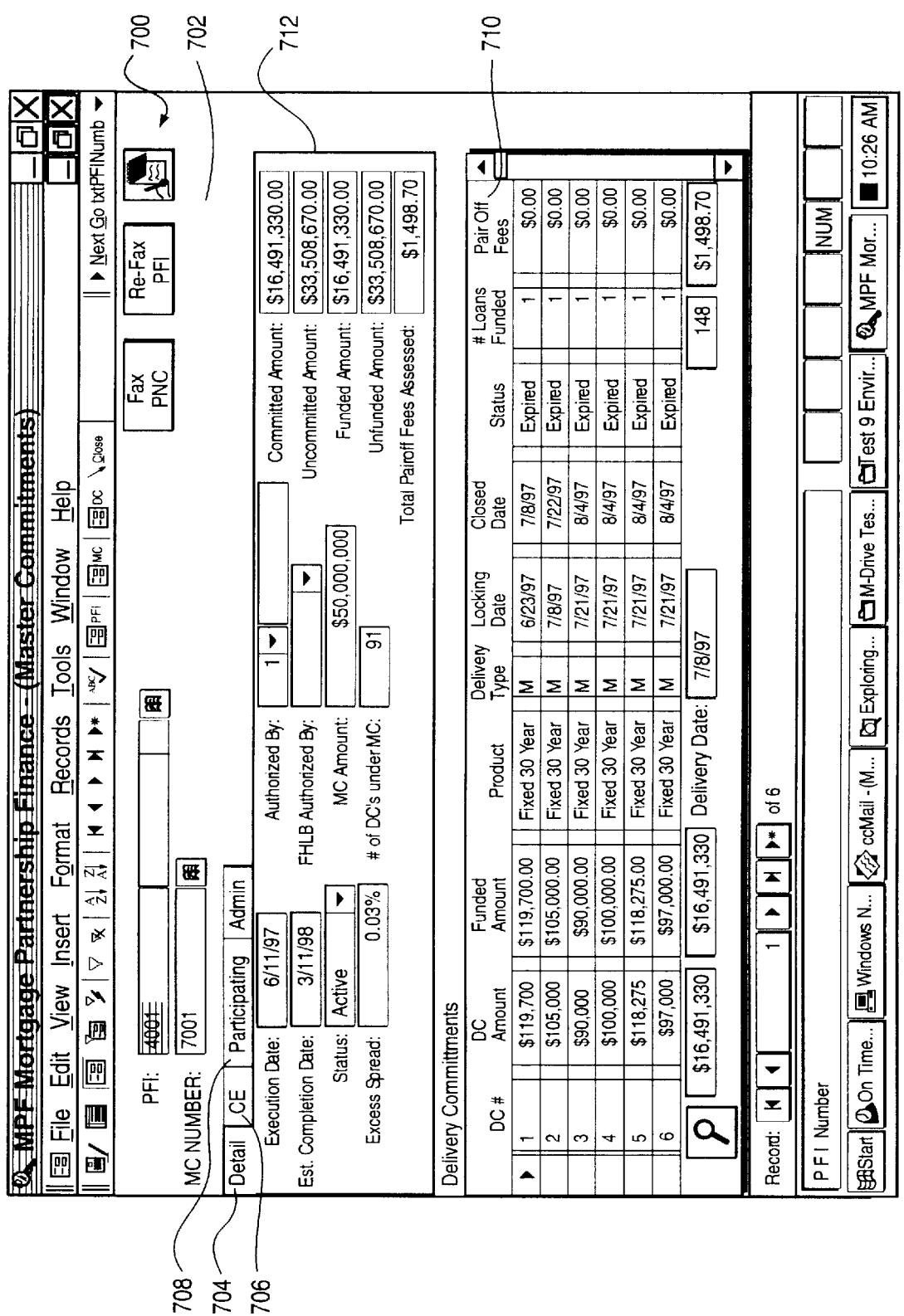
Figure 7C:
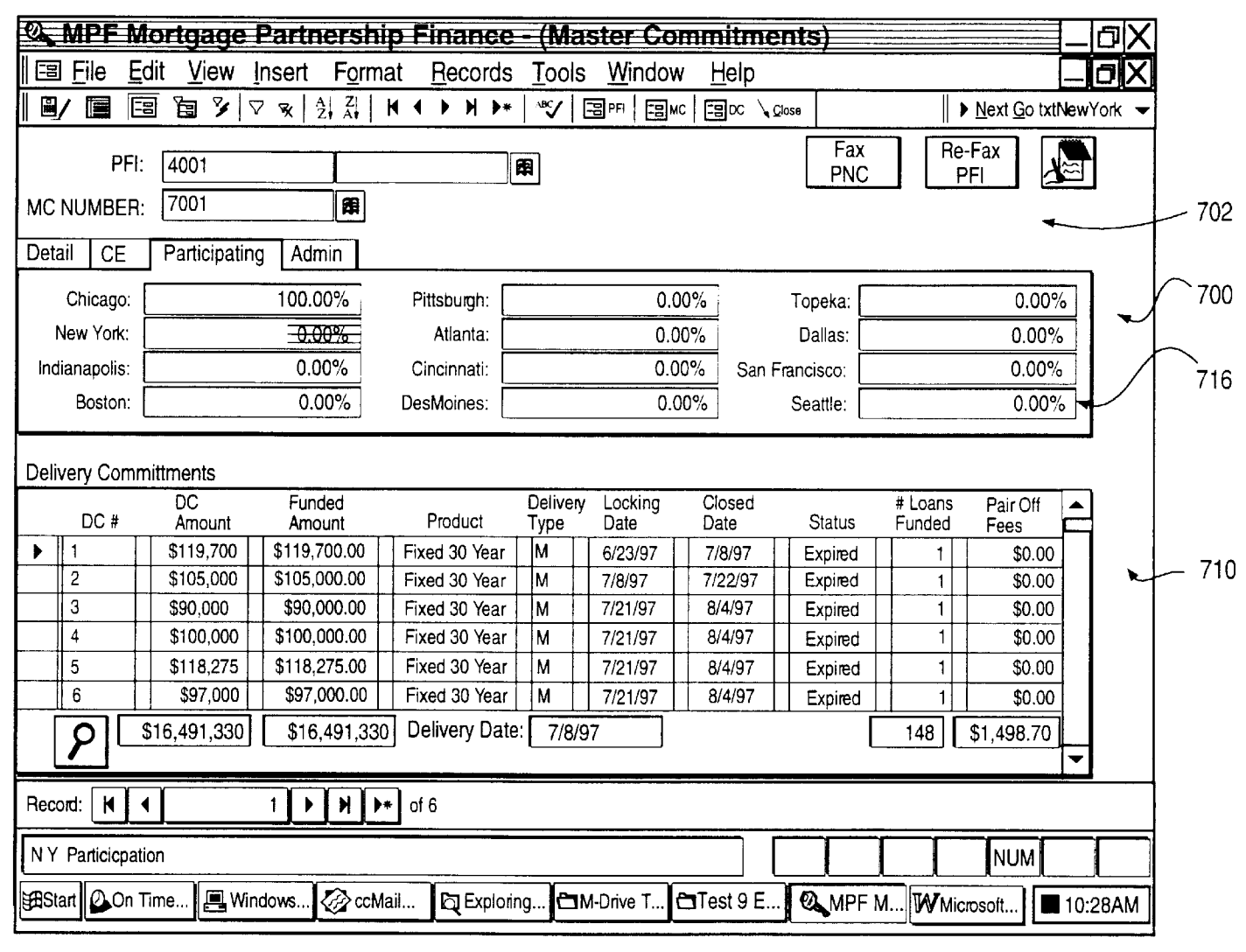

FIGS. 7A–7C show the screens which display the Master Commitment data entered in step 208 in FIG. 2 relating to a current Master Commitment agreement. In the preferred embodiment, the Master Commitment agreement and the particular mortgage originator are assigned identification numbers which may be displayed or used for recalling specific data. The identification information is displayed in an identification area 702 at the top of the screen 700. The Master Commitment screen 700 shown in FIG. 7A has a number of tabs which each activate screen areas to display different data relating to the Master Commitment agreement. These tabs include a detail tab 704, a credit enhancement tab 706 and a participation tab 708 which each activate screen displays as will be explained below.

All the displays in the Master Commitment screen 700 in FIGS. 7A–7C have a delivery commitment area 710 where data such as the delivery commitment amount, funded amount, product type, delivery type, locking date, closing date, status, number of loans funded and fees are displayed. A detail area 712 shown in FIG. 7A displays data such as the execution date, completion date, status, numbers of delivery commitments under the Master Commitment and the amount of the Master Commitment (e.g. $50,000,000). The detail area 712 also displays the committed amount (e.g. $16,491,330), the uncommitted amount (e.g. $33,508,670), the funded amount (e.g. $:16,491,330), the unfunded amount, if any, (e.g. $33,508,670) and the total pair off fees assessed ($1,498.70). Pair off fees may result when a delivery commitment expires without being filled.

FIG. 7B shows the screen displayed by selecting the credit enhancement tab 704. The total data for all the credit enhancements which are determined in step 314 in FIG. 3A for the Master Commitment are displayed on a credit enhancement area 714. This data includes the form of the credit enhancement which may be a corporate guarantee or a collateral obligation. The data also includes the credit enhancement amount (e.g. $2,275,000) and the credit enhancement percentage (e.g. 4.5%). The credit enhancement percentage is the level of credit risk assumed by the mortgage originator under the risk allocation agreement. The credit enhancement area 714 also displays the credit enhancement fee paid to the mortgage originator (e.g. 0.110%) as well as the credit enhancement amount used (e.g. $ 550,201.61) and credit enhancement amount available (e.g. $1,724,789.39).

FIG. 7C shows a participation area 716 displayed when the participation tab 708 is selected. The participation screen shows the percentage of the agreement for each participating funding institution in a particular Master Commitment as determined in step 208 of FIG. 2 when establishing the Master Commitment.

Figure 8A:
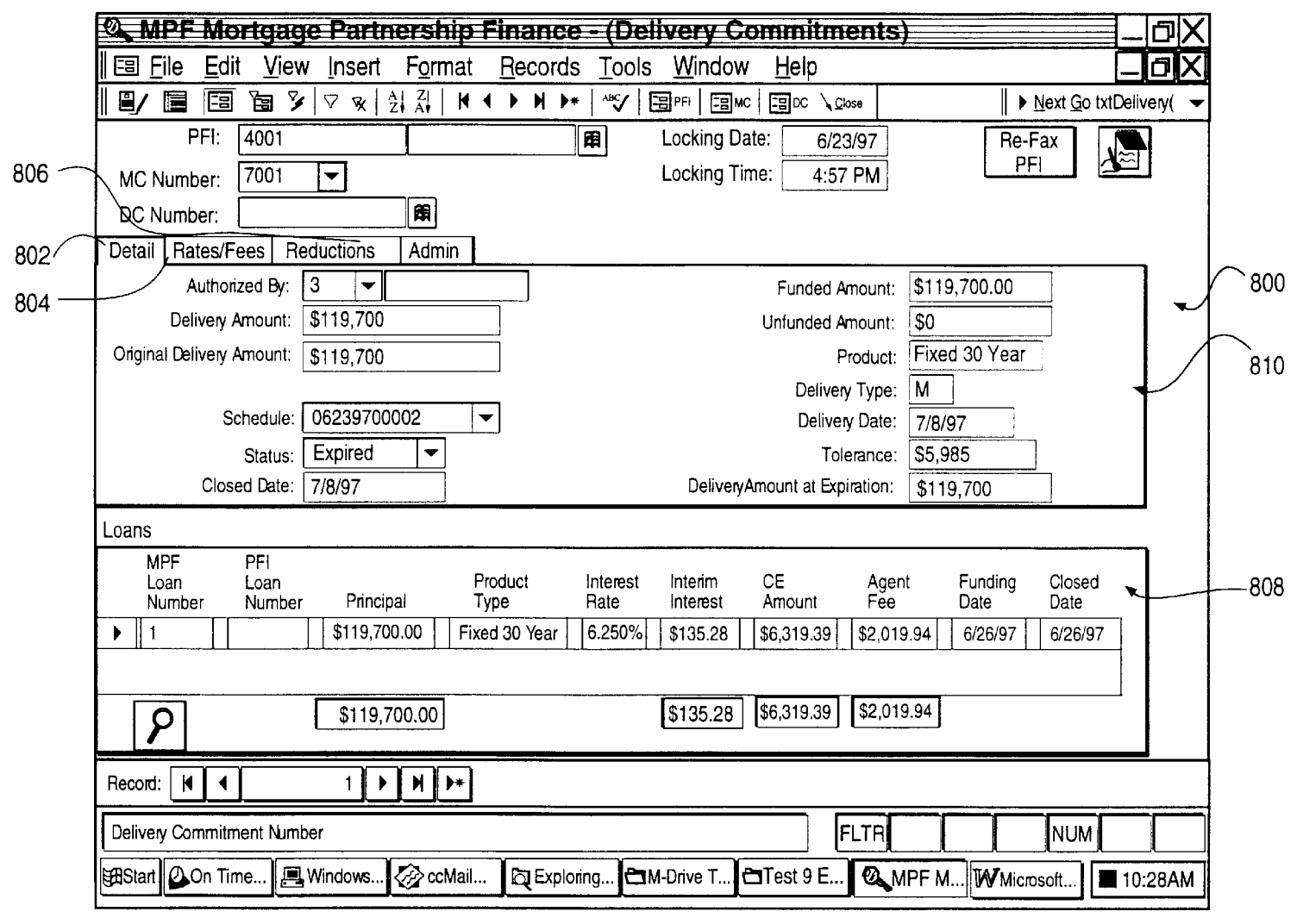
Figure 8C:
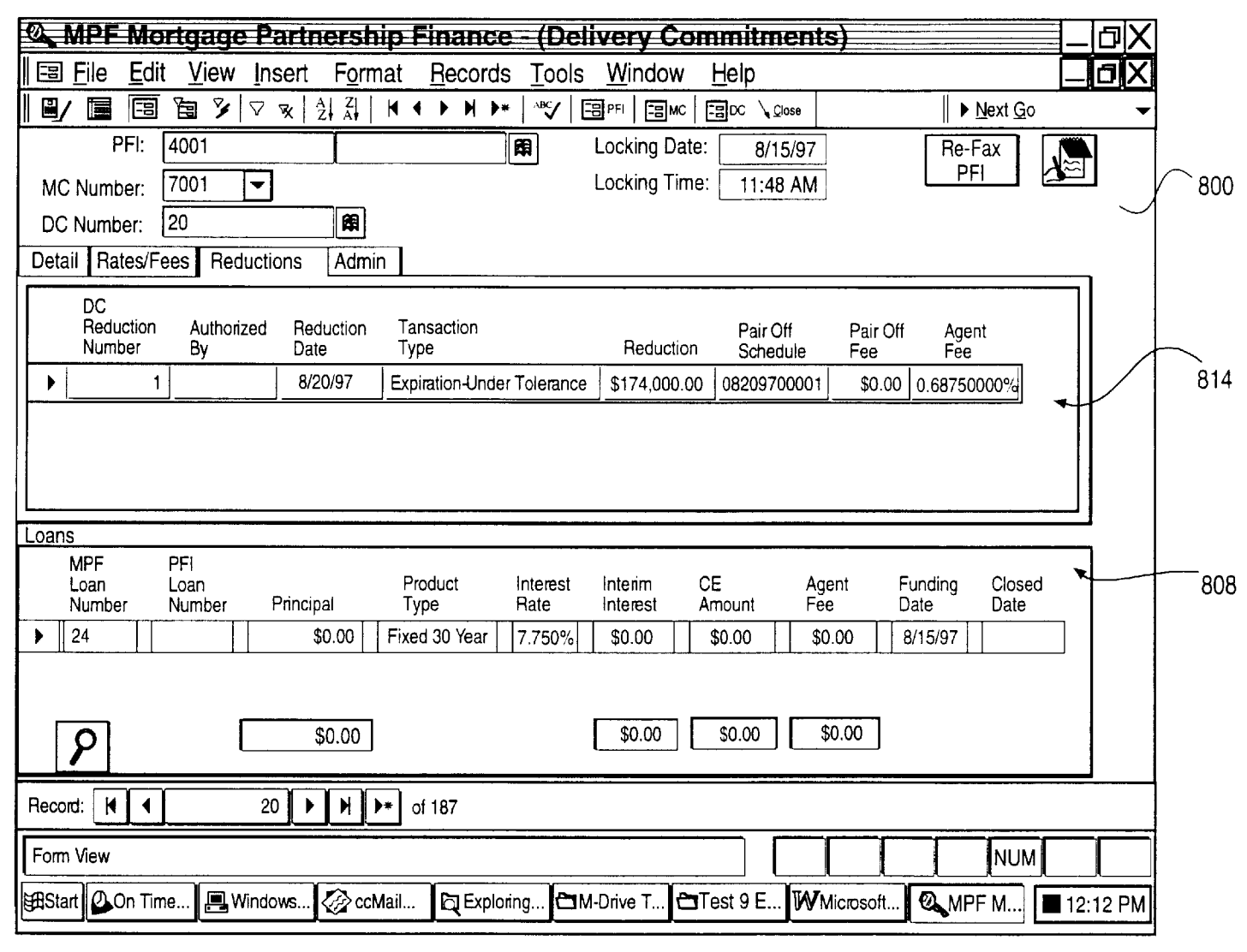

FIGS. 8A–8C show the screens displayed for recording information on each delivery commitment in step 406 of FIG. 4A. A delivery commitment screen 800 shows the identification numbers for the mortgage originator and the master commitment and the delivery commitment. The delivery commitment screen 800 has a detail tab 802, a rates/fee tab 804, and a reduction tab 806. Selecting each of the tabs 802, 804 and 806 displays various data relating to the delivery commitment entered in step 406 of FIG. 4A. The loan data associated with each delivery commitment is displayed in a loan data area 808 in all the delivery commitment screens 800 in FIGS. 8A–8C. The loan data displayed includes the principal, product type, interest rate, interim interest, credit enhancement amount, agent fee, funding date and closing date.

A detail area 810 in FIG. 8A is displayed by selecting detail tab 802. The detail area 810 displays data such as the delivery amount (e.g. $119,700), original delivery amount, the funded amount (e.g. $119,700), unfunded amount, product type, delivery date (e.g. Jul. 8, 1997) and the tolerance (e.g. $5,985) used in step 322 in FIG. 3B to determine the rates.

A rates/fees area 812 shown in FIG. 8B is displayed by selecting the rates/fees tab 804. The rates/fee area 812 displays the rates and fees which are determined in step 328 of FIG. 3B. A reductions area 814 shown in FIG. 8C is displayed by selecting the reductions tab 806. The reductions area 814 displays data associated with a reduction in the delivery commitment. This reduction occurs when a delivery commitment expires without being completely filled.

FIGS. 9A–9D show the screens for the display of loan data as explained in step 426 in FIG. 4B. The loan screens 900 in FIGS. 9A–9D include a loan information area 902. The loan information area 902 includes data such as the name of the borrower, the address, the principal of the mortgage, the status of the loan, the closing date (e.g. Jun. 26, 1997), and identification number. The loan screens 900 include a borrower tab 904, a property tab 906, a loan characteristics tab 908, a funding tab 910, a post closing tab 912 and a document dates tab 914.

Selecting the borrower tab 904 displays data in a borrower area 916 on a borrower such as their name, income and FICO score. Selecting the property tab 906 will display data relating to the property such as type of property, occupancy, number of units, etc. Selecting the loan characteristics tab 908 will display a loan characteristics screen 918 shown in FIG. 9B. The characteristics screen 918 in FIG. 9B has a loan detail area 920 which displays data such as the first payment date (Aug. 1, 1997), number of months (360), the maturity date (Jul. 1, 2027) and the principal and interest amounts currently paid ($899.27). The screen 918 also includes a loan statistics area 922 which displays data such as the interest rate, credit enhancement amount, PMI percentage and loan to value ratio. The screen 918 also includes a schedule area 924 which allows a user to view the schedule of rates and fees determined in step 328 in FIG. 3B.

Figure 9A:
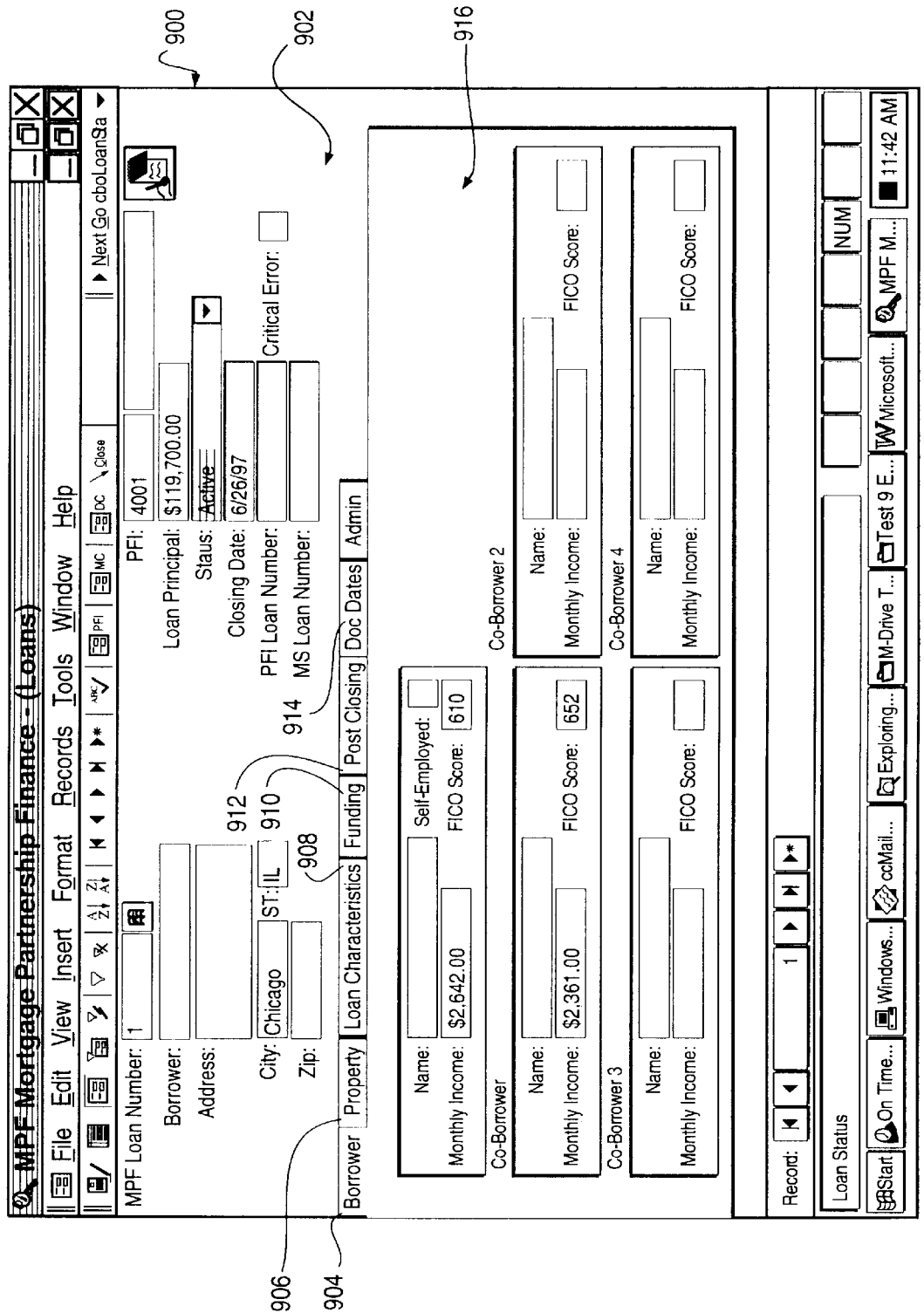
FIGS. 9A-9D are screen prints of the mortgage loan data displays according to the present invention.
Figure 9B:
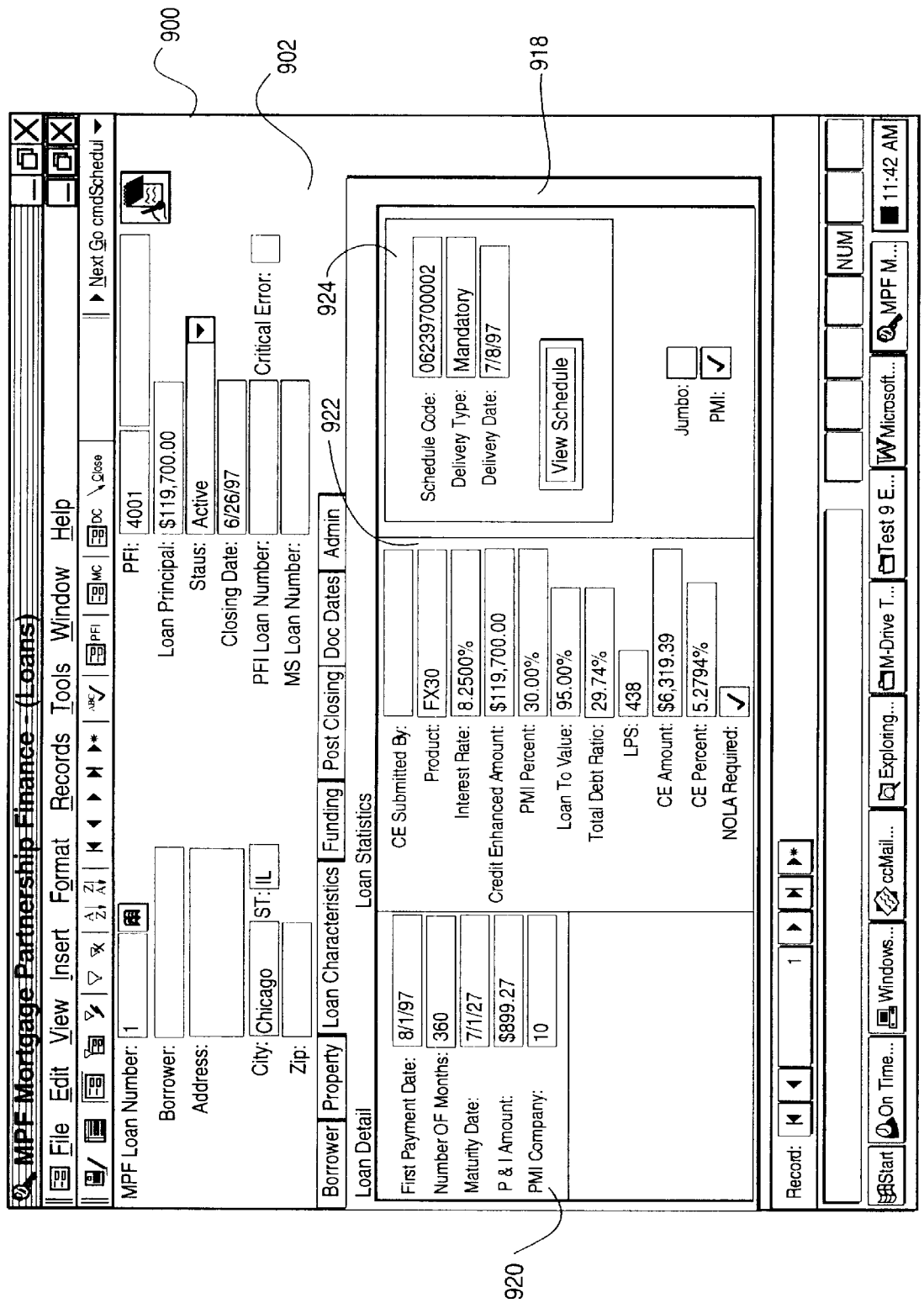
Figure 9C:
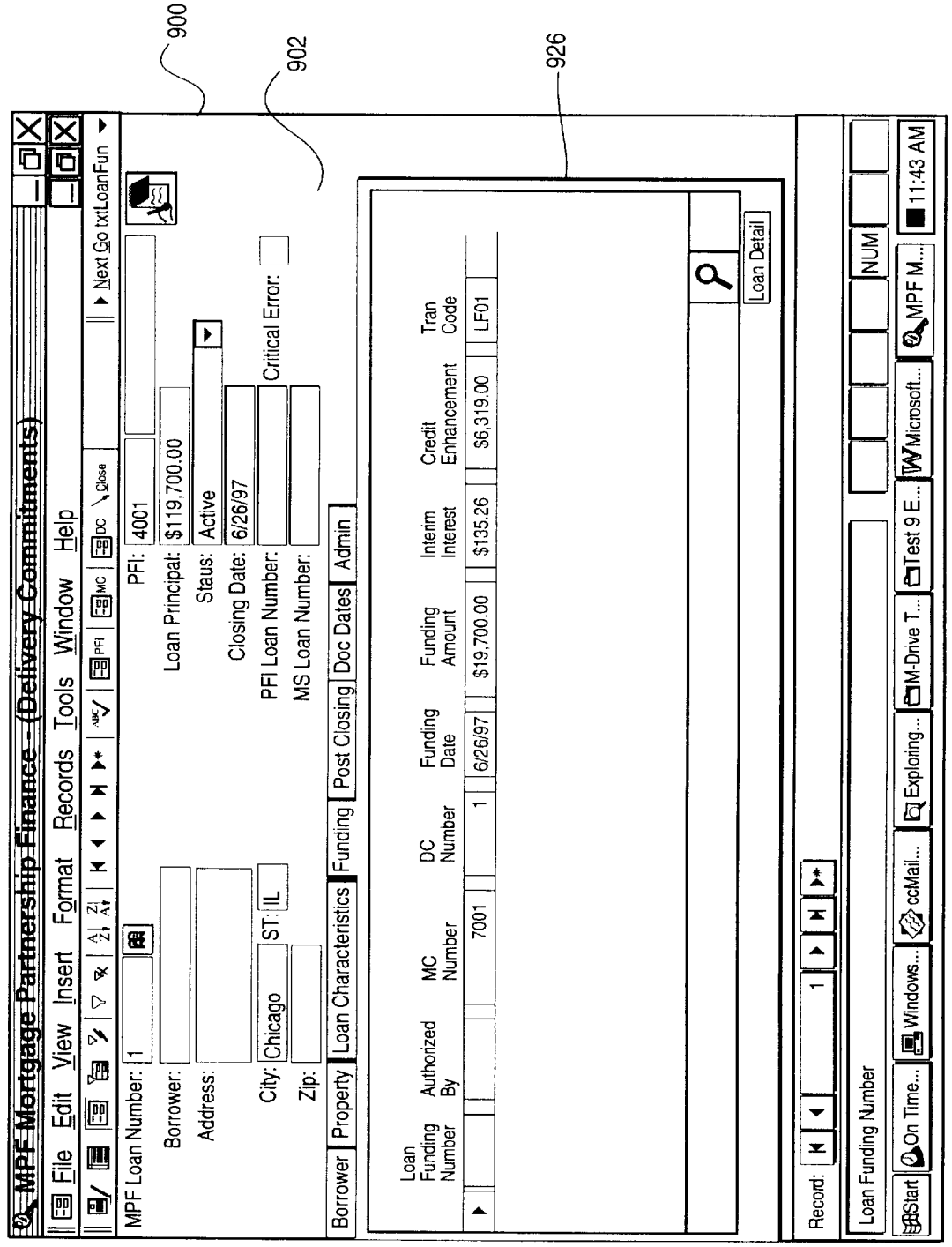
Figure 9D:
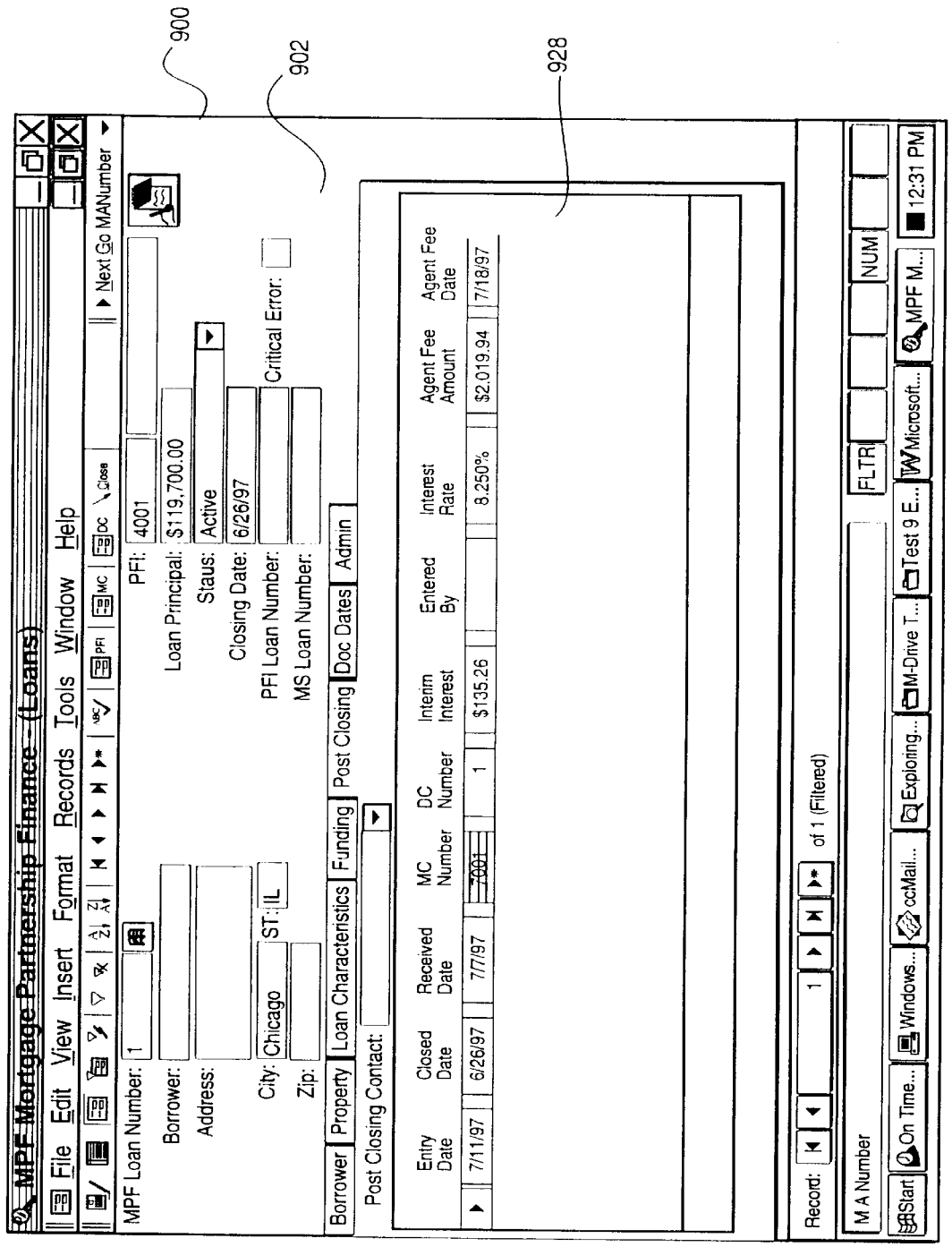

Selecting the funding tab 910 will display the funding area 926 shown in FIG. 9C. The data displayed includes data relating to the loan including the Master Commitment identification number, the delivery commitment identification number, the funding date, the funding amount and credit enhancement. Selecting the post funding tab 912 displays a post closing area 928 shown in FIG. 9D. The post closing area 928 displays data to the user post closing as shown in step 506 in FIG. 5A. Selecting the document dates tab 914 allows a user to determine the dates required documents were received by the custodian.

Figure 10:
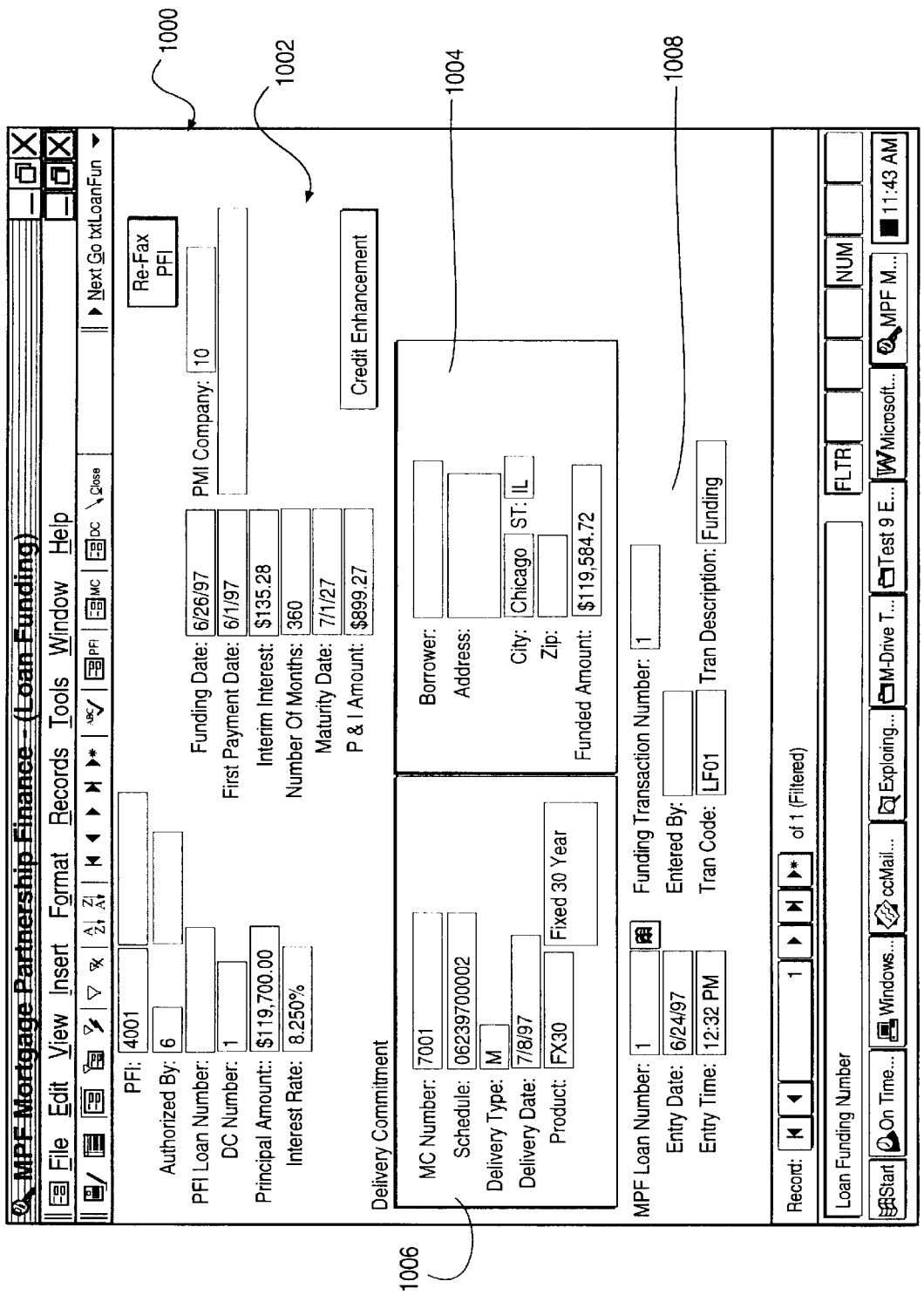
FIG. 10 is a screen print of the loan funding display according to the present invention.

FIG. 10 shows the screen displayed during the funding confirmation routine in FIGS. 5A-5B. FIG. 10 shows a loan funding screen 1000. The loan funding screen 1000 includes a loan level area 1002 which displays mortgage loan specific data such as the principal amount, interest rate, funding date, first payment date, interim interest, and amount paid. A borrower area 1004 displays data related to the borrower. A delivery commitment area 1006 displays data relating to the delivery commitment. A tracking area 1008 includes data used to track the mortgage loan transactions.

Figure 11:
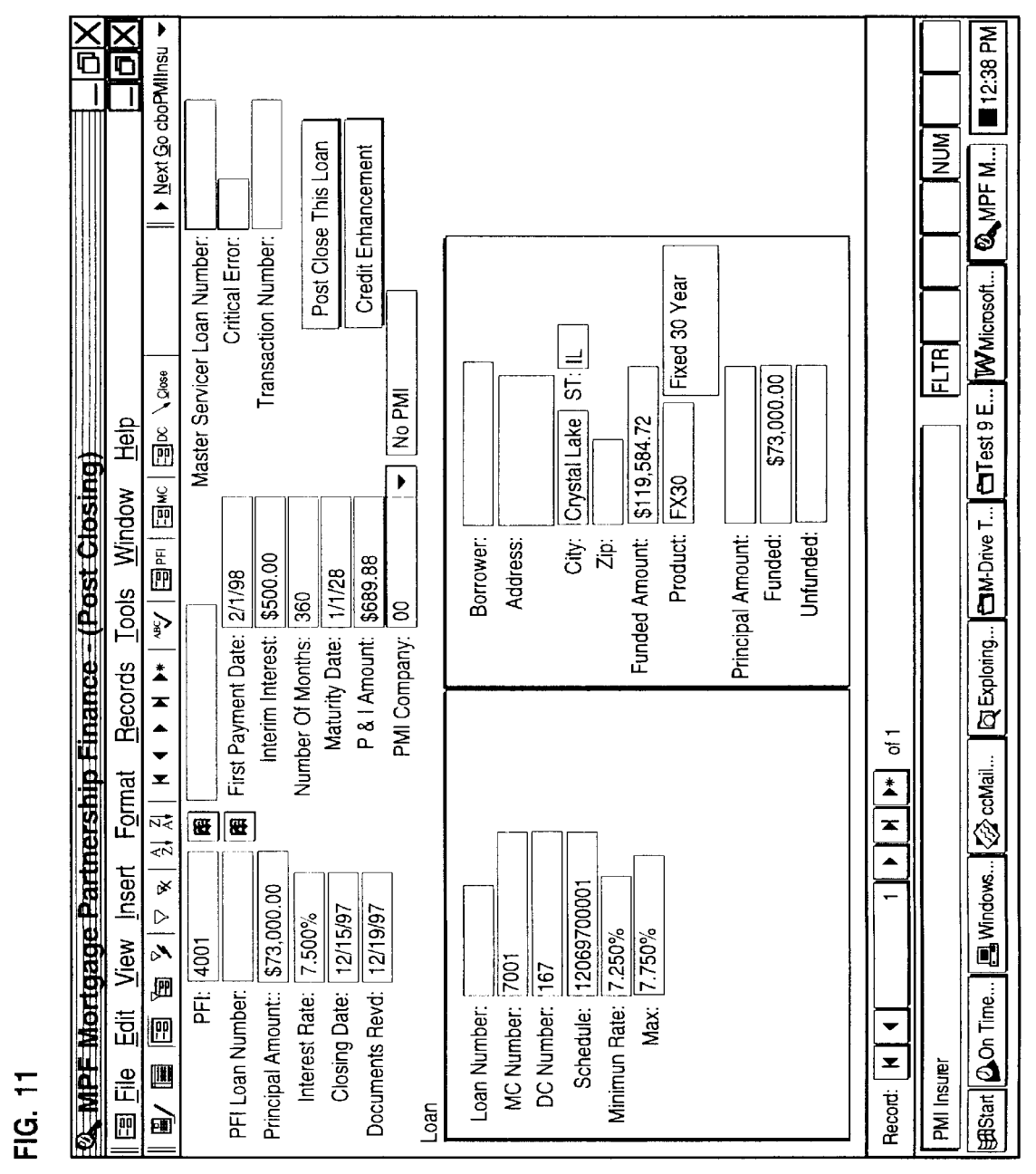

FIG. 11 shows the post closing screen which is displayed when the post closing button 626 in the main menu screen 600 in FIG. 6 is selected. The post closing screen displays general information for each loan in the post closing process as shown in FIGS. 5A-5B. This screen displays data similar to that of the loan funding screen in FIG. 10. This allows a user to enter new information in order to reconcile the results as in step 518 of FIG. 5A.

Figure 3A:
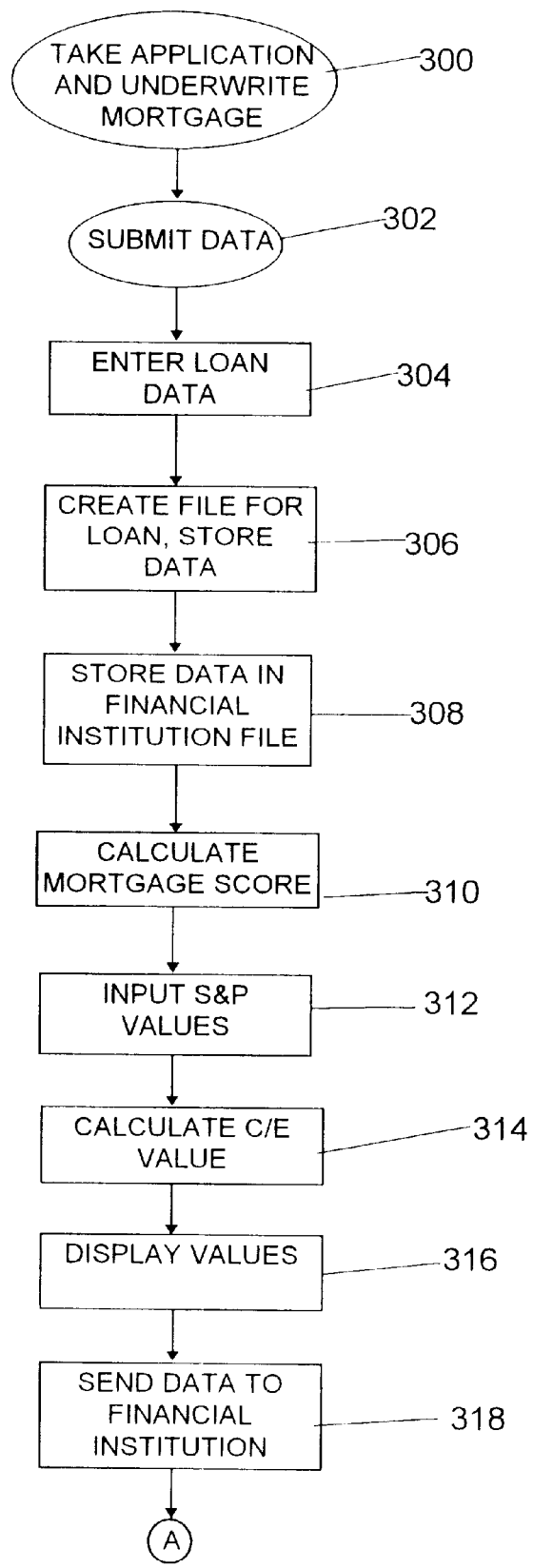
FIGS. 3A and 3B are a flow diagram of a data analysis routine used to evaluate mortgage data and produce rate and fee schedules which are transmitted to the mortgage originator by the funding institution according to the present invention.
Figure 3B:
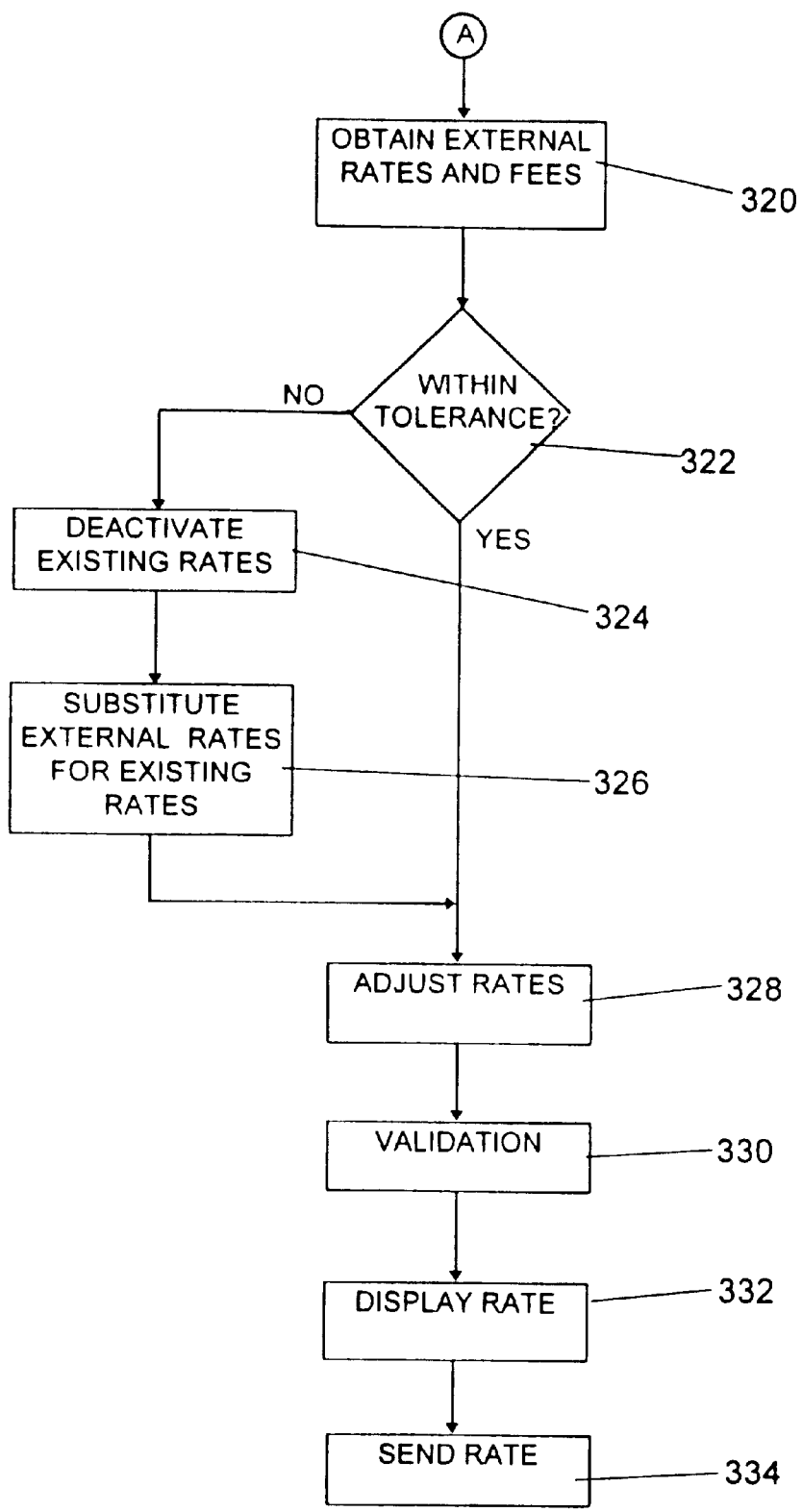
Figure 12A:
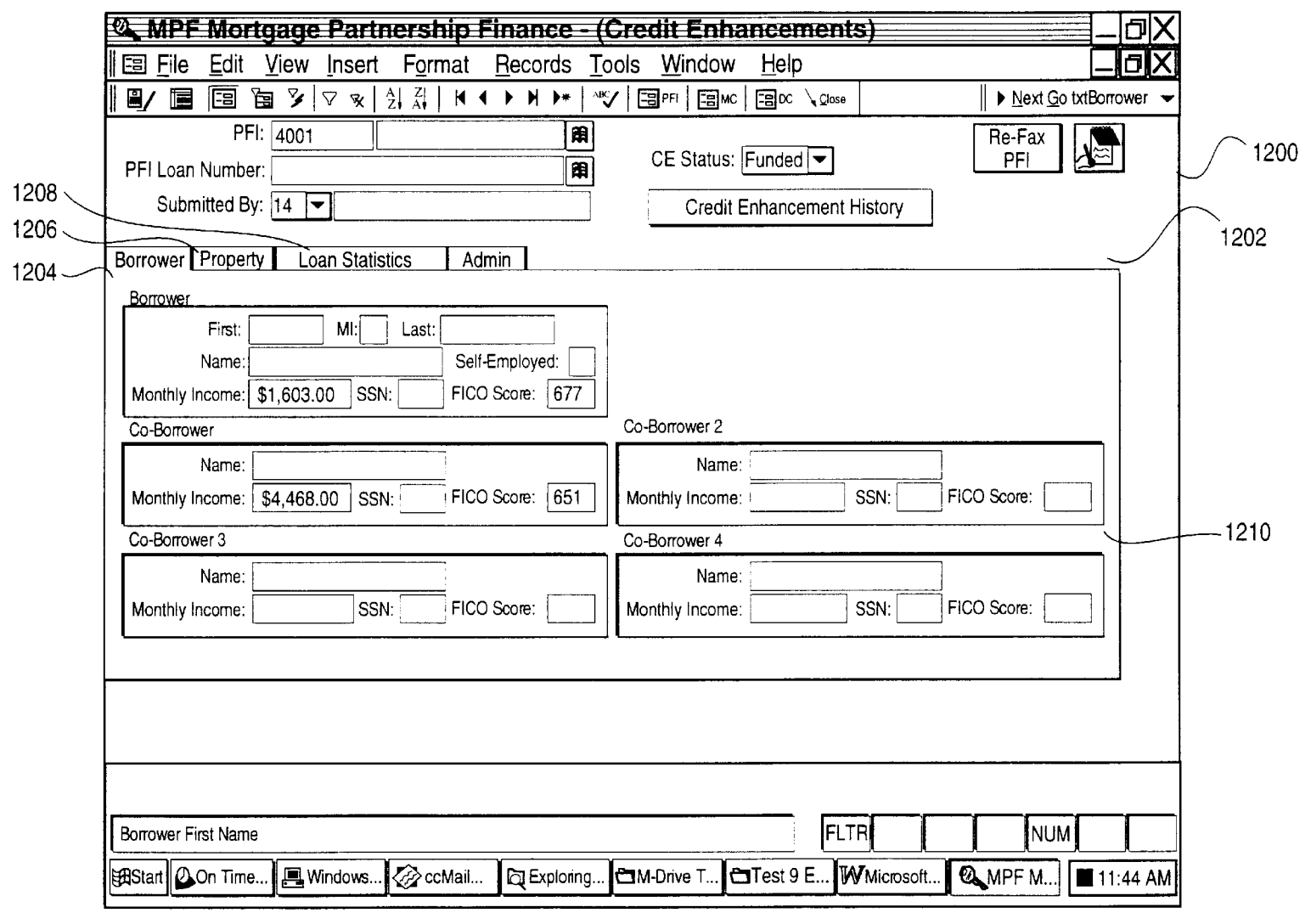
Figure 12B:
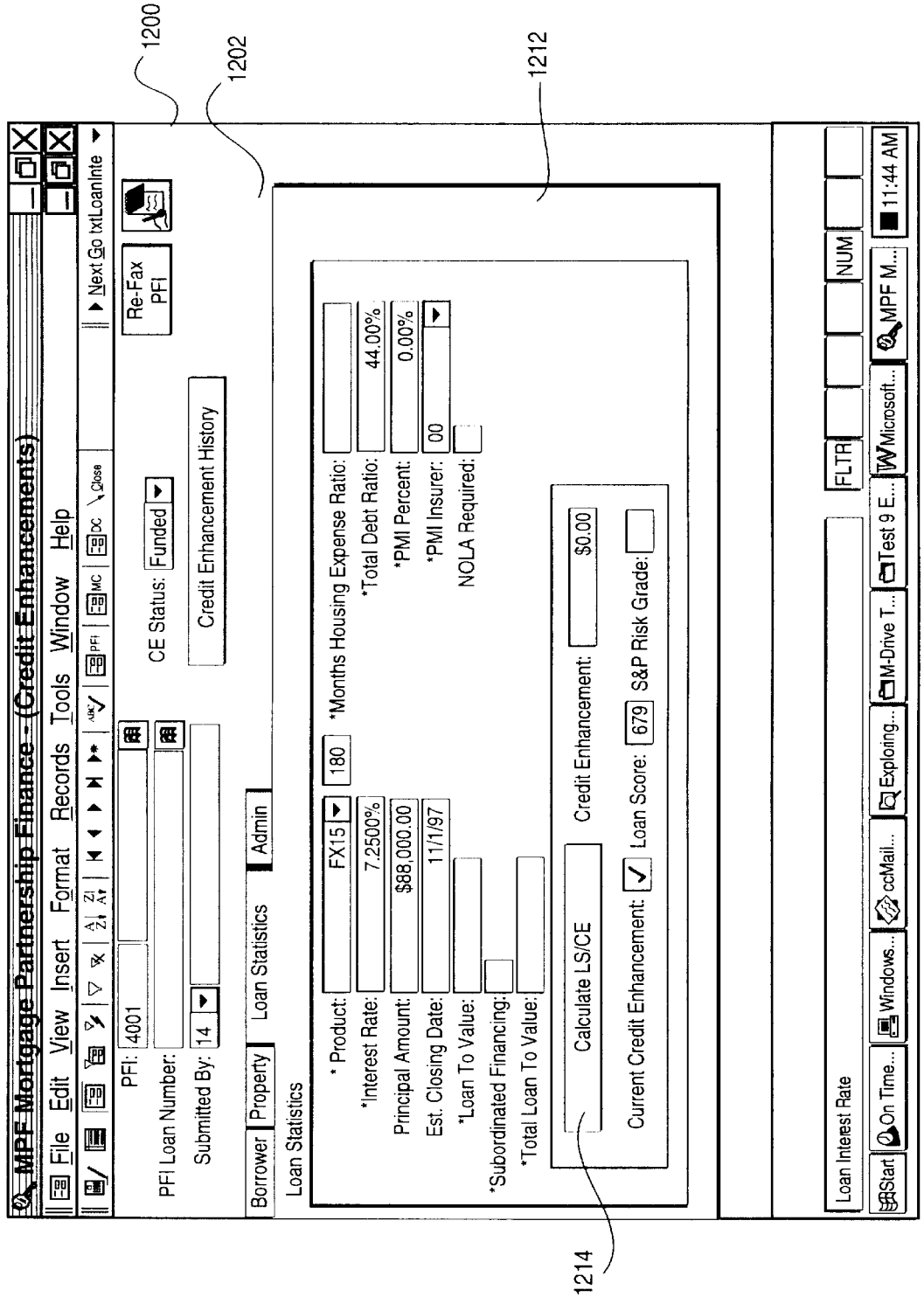

FIGS. 12A and 12B show the credit enhancement screens displayed to the user in step 316 of FIG. 3A. The credit enhancement screens 1200 have an identification area 1202 which displays identification data and the credit enhancement status. The user can request the credit enhancement history which is based on the credit enhancements determined in step 318 in FIG. 3A. The credit enhancement screens 1200 have a borrower tab 1204, a property tab 1206 and a loan statistics tab 1208. Selecting the borrower tab 1204 displays data on the borrower in a borrower area 1210. Selecting the property tab 1206 will display data relating to the property. Selecting the loan statistics tab 1208 displays the loan statistics area 1212 shown in FIG. 12B. The loan statistics area 1212 displays the data on each loan required prior to calculating the credit enhancement in step 318 of FIG. 3A. This data includes the product type, interest rate, principal amount, estimated closing date, loan to value ratio, etc. The area 1212 includes a calculate LS/CE. button 1214 which activates the software calls for the MGIC model and S&P software in steps 310 and 312 in FIG. 3A. The resulting data is displayed in the fields in area 1212.

It will be apparent to those skilled in the art that various modifications and variations can be made in the method and system of the present invention without departing from the spirit or scope of the invention. Thus, it is intended that the present invention cover modifications and variations that come within the scope of the spirit of the invention and the claims that follow.

What is claimed is:

1. A computer system for managing the allocation of mortgage risk between a mortgage originator and a funding institution, the mortgage originator issuing a mortgage, and the funding institution agreeing to assume certain risks for the mortgage, the mortgage originator and the funding institution entering into a Master Commitment agreement having an overall credit enhancement value for mortgage funding, the system comprising:

an input device capable of receiving mortgage data including principal amount, interest rate, loan to value ratio and debt ratio from the mortgage originator;

a memory having a database storing the data relating to the mortgage loan;

a processor which calculates a credit enhancement value as a function of a mortgage score reflecting the probability of foreclosure and the mortgage data;

an output device which produces a delivery commitment agreement wherein the mortgage originator assumes obligation for losses up to the credit enhancement value and the funding institution assumes obligation for additional losses.

2. The system of claim 1 further comprising:

a comparison circuit which compares the total of the credit enhancement value and previous credit enhancement values with the overall credit enhancement value set forth in the Master Commitment; and wherein the output device informs the user if the credit enhancement value and the previous credit enhancement values exceed the overall credit enhancement value set forth in the Master Commitment.

3. The system of claim 1 further comprising:

a calculation circuit which produces a rate and fee schedule based on selecting a stored standard rate and fee schedule based on the credit enhancement value; and a rate input circuit for reading external rate and fee schedule data;

a comparison circuit which compares the external rate and fee schedule data with the stored standard rate and fee schedule and determines whether the stored rate and fee schedule is within a certain tolerance value of the external rate and fee schedule.

4. The system of claim 1 further comprising a storage circuit having:

a record file for data relating to the mortgage originator;

a record file for data relating to the Master Commitment including the overall credit enhancement value, dollar size of commitment and credit enhancement fee;

a record file for the loan data including the credit enhancement value, principal and interest rate; and a record file for the delivery commitment data.

5. The management system of claim 4 wherein the processor recalls information from the record files for the mortgage originator and the record files for each loan and produces reports having financial data relating to the mortgages.

6. The system of claim 4 further comprising an accumulation circuit which records loan data associated with a delivery commitment agreement.

7. The system of claim 1 wherein the mortgage score is calculated using the MGIC LPS model.

8. The system of claim 1 wherein the credit enhancement value is calculated using the S&P Level II model.

9. The system of claim 1 wherein the output device is a printer.

10. The system of claim 1 wherein the output device in a display screen.

11. The system of claim 1 wherein the output device is a fax/modem.

12. The system of claim 1 wherein the processor compares the data for the loan with external audit data and wherein the processor indicates whether the external audit data differs from the data for the loan.

* * * * *